(12) United States Patent
Wang et al.

(10) Patent No.: US 11,231,845 B2
(45) Date of Patent: Jan. 25, 2022

(54) DISPLAY ADAPTATION METHOD AND APPARATUS FOR APPLICATION, AND STORAGE MEDIUM

(71) Applicant: TENCENT TECHNOLOGY COMPANY LIMITED, Shenzhen (CN)

(72) Inventors: Junxiang Wang, Shenzhen (CN); Guoju Zhang, Shenzhen (CN); Yizhong Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/016,307

(22) Filed: Sep. 9, 2020

(65) Prior Publication Data

US 2020/0409545 A1 Dec. 31, 2020

Related U.S. Application Data

(63) Continuation of application No. PCT/CN2019/099863, filed on Aug. 8, 2019.

(30) Foreign Application Priority Data

Aug. 9, 2018 (CN) .......................... 201810903285.8

(51) Int. Cl.
*G06F 3/0484* (2013.01)
*G06F 3/0488* (2013.01)
*G09G 5/373* (2006.01)

(52) U.S. Cl.
CPC ...... *G06F 3/04847* (2013.01); *G06F 3/04845* (2013.01); *G06F 3/04883* (2013.01);
(Continued)

(58) Field of Classification Search
CPC ............ G06F 3/04847; G06F 3/04845; G06F 3/04883; G06F 2203/04808; G09G 5/373; G09G 2340/145; G09G 2354/00
See application file for complete search history.

(56) References Cited

U.S. PATENT DOCUMENTS 8,456,571 B1 * 6/2013 Taylor .................. H04N 7/0122
348/445
2010/0149216 A1 6/2010 Dutta et al.
(Continued)

FOREIGN PATENT DOCUMENTS

CN 104298433 A 1/2015
CN 105740107 A 7/2016
(Continued)

OTHER PUBLICATIONS

The World Intellectual Property Organization (WIPO) International Search Report for PCT/CN2019/099863 dated Oct. 28, 2019 5 Pages (including translation).
(Continued)

*Primary Examiner* — James T Tsai
(74) *Attorney, Agent, or Firm* — Anova Law Group, PLLC

(57) ABSTRACT

A display adaptation method for an application executed by a terminal includes: displaying a setting interface for setting at least one zone boundary of an interface safe operation zone, the interface safe operation zone being a zone used for displaying a human-computer interaction control responsive to one or more gesture operations in the application; receiving a boundary setting operation triggered on the setting interface; determining positional parameters of zone boundaries of the interface safe operation zone according to the
(Continued)

boundary setting operation; and generating, according to the positional parameters, the interface safe operation zone adapted to the terminal.

13 Claims, 13 Drawing Sheets

(52) U.S. Cl.
CPC ... *G09G 5/373* (2013.01); *G06F 2203/04808* (2013.01); *G09G 2340/04* (2013.01); *G09G 2340/145* (2013.01); *G09G 2354/00* (2013.01)

(56) References Cited

U.S. PATENT DOCUMENTS

| | | | |
|---|---|---|---|
| 2011/0273540 A1* | 11/2011 | Lee | G09G 5/14 348/51 |
| 2013/0212535 A1* | 8/2013 | Kim | G06F 3/04886 715/841 |
| 2013/0257768 A1 | 10/2013 | Lee et al. | |
| 2013/0283206 A1 | 10/2013 | Kim et al. | |
| 2014/0059501 A1 | 2/2014 | Yuu et al. | |
| 2014/0146330 A1* | 5/2014 | Miyata | G06F 3/04845 358/1.9 |
| 2014/0253477 A1* | 9/2014 | Shim | G06F 1/1652 345/173 |
| 2014/0298224 A1 | 10/2014 | Arita et al. | |
| 2016/0077663 A1* | 3/2016 | Durojaiye | G06F 3/041 345/173 |
| 2016/0132992 A1 | 5/2016 | Rodrig et al. | |
| 2017/0123638 A1* | 5/2017 | Yamada | G06F 3/0488 |
| 2018/0059919 A1* | 3/2018 | Wan | G06F 40/103 |
| 2019/0138203 A1* | 5/2019 | Yildiz | G06F 3/03545 |
| 2020/0169596 A1 | 5/2020 | Qu et al. | |

FOREIGN PATENT DOCUMENTS

| | | |
|---|---|---|
| CN | 106354396 A | 1/2017 |
| CN | 107291356 A | 10/2017 |
| CN | 107632874 A | 1/2018 |
| CN | 107678645 A | 2/2018 |
| CN | 107679120 A | 2/2018 |
| CN | 107943386 A | 4/2018 |
| CN | 108073343 A | 5/2018 |
| CN | 108182043 A | 6/2018 |
| CN | 108196755 A | 6/2018 |
| CN | 109308205 A | 2/2019 |
| EP | 2657829 A2 | 10/2013 |
| JP | 2010161762 A | 7/2010 |
| JP | 2012121179 A | 6/2012 |
| JP | 2015026194 A | 2/2015 |
| WO | 2013105252 A1 | 7/2013 |

OTHER PUBLICATIONS

The State Intellectual Property Office of the People's Republic of China (SIPO) Office Action 1 for 201810903285.8 dated Nov. 28, 2019 9 Pages (including translation).

The State Intellectual Property Office of the People's Republic of China (SIPO) Office Action 2 for 201810903285.8 dated Aug. 4, 2020 10 Pages (including translation).

The European Patent Office (EPO) Office Action 1 for for 19846276 dated Sep. 9, 2021 8 Pages (including translation).

The Japan Patent Office (JPO) Notification of Reasons for Refusal for Application No. 2020-550870 and Translation dated Nov. 1, 2021 7 Pages.

\* cited by examiner

DISPLAY ADAPTATION METHOD AND APPARATUS FOR APPLICATION, AND STORAGE MEDIUM

CROSS-REFERENCES TO RELATED APPLICATIONS

This application is a continuation application of PCT Patent Application No. PCT/CN2019/099863, filed on Aug. 8, 2019, which claims priority to Chinese Patent Application No. 201810903285.8, filed on Aug. 9, 2018 and entitled "DISPLAY ADAPTATION METHOD AND APPARATUS FOR APPLICATION, DEVICE, AND STORAGE MEDIUM", the entire contents of both of which are incorporated herein by reference.

FIELD OF THE TECHNOLOGY

The present disclosure relates to the field of program development, and in particular, to a display adaptation method and apparatus for an application, a device, and a storage medium.

BACKGROUND OF THE DISCLOSURE

Special-shaped (e.g., non-rectangular) screens are screens widely used on mobile terminals such as a smartphone and a tablet computer. A typical special-shaped screen is a notch screen, that is, a screen on which a notch is formed on an upper edge of a rectangular screen.

Because shapes and resolutions of special-shaped screens used on different types of mobile terminals are different from each other, it is difficult for the same application to adapt to a plurality of types of mobile terminals. In the related art, a mobile terminal provides an adaptation manner using black borders in an operating system layer. When an application that has not been adapted to the screen shape runs in a landscape mode, an operating system automatically displays black edges at two or four sides of the screen, and displays a user interface (UI) of the application in the central part of the screen of the mobile terminal.

In the foregoing technology, because the two sides of the screen of the mobile terminal need to be displayed as black, a scene, a background, and a UI control of the UI of the application need to be cropped toward a central direction. Consequently, a field of view displayed by the UI of the application is limited, and a display effect is relatively poor.

SUMMARY

The present disclosure provides a display adaptation method and apparatus for an application, a device, and a storage medium, which can be used for resolving a problem that an adaptation method in the related art causes a limited field of view displayed by an application and a relatively poor display effect. The technical solutions include the following content.

According to an aspect of embodiments of the present disclosure, a display adaptation method for an application is provided, and includes: displaying a setting interface for setting at least one zone boundary of an interface safe operation zone, the interface safe operation zone being a zone used for displaying a human-computer interaction control responsive to one or more gesture operations in the application; receiving a boundary setting operation triggered on the setting interface; determining positional parameters of zone boundaries of the interface safe operation zone according to the boundary setting operation; and generating, according to the positional parameters, the interface safe operation zone adapted to the terminal.

According to another aspect of the embodiments of the present disclosure, a display adaptation apparatus for an application is provided, and includes a memory and a processor. The processor is configured to perform: displaying a setting interface for setting at least one zone boundary of an interface safe operation zone, the interface safe operation zone being a zone used for displaying a human-computer interaction control responsive to one or more gesture operations in the application; receiving a boundary setting operation triggered on the setting interface; determining positional parameters of zone boundaries of the interface safe operation zone according to the boundary setting operation; and generating, according to the positional parameters, the interface safe operation zone adapted to the terminal.

According to another aspect of the embodiments of the present disclosure, a computer device is provided, and includes: a processor and a memory, the memory storing at least one instruction, at least one program, and a code set or an instruction set, and the at least one instruction, the at least one program, and the code set or the instruction set being loaded and executed by the processor to implement the display adaptation method for an application described above.

According to another aspect of the embodiments of the present disclosure, a non-transitory computer-readable storage medium is provided. The readable storage medium stores at least one instruction, at least one program, and a code set or an instruction set, the at least one instruction, the at least one program, and the code set or the instruction set being loaded and executed by a processor to implement: displaying a setting interface for setting at least one zone boundary of an interface safe operation zone, the interface safe operation zone being a zone used for displaying a human-computer interaction control responsive to one or more gesture operations in the application; receiving a boundary setting operation triggered on the setting interface; determining positional parameters of zone boundaries of the interface safe operation zone according to the boundary setting operation; and generating, according to the positional parameters, the interface safe operation zone adapted to the terminal.

It is to be understood that the foregoing general descriptions and the following detailed descriptions are only exemplary, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with the specification, serve to explain the principles of the present disclosure.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following exemplary embodiments do not represent all implementations that are consistent with the present disclosure. On the contrary, the implementations are merely examples of apparatuses and methods consistent with those are described in detail in the appended claims and some aspects of the present disclosure.

A touchscreen is a main interaction component on a mobile terminal, and therefore, a screen-to-body ratio of the mobile terminal is an indicator affecting user experience to a great extent. Currently, mobile terminals are all developed toward a full screen, and the full screen is a relatively broad definition of a design of a mobile phone having an ultrahigh screen-to-body ratio in mobile phone industry. A literal explanation of the full screen is that an entire front surface of a mobile phone is a screen, and a frameless design is used in all four frame positions of the mobile phone, to pursue a screen-to-body ratio approaching 100%.

However, limited by the current mass production technologies, full-screen mobile phones propagandized in the industry are merely mobile phones having an ultrahigh screen-to-body ratio temporarily, and mobile phones having front surfaces with a screen-to-body ratio of 100% cannot be implemented. Currently, the full-screen mobile phone mentioned in the industry is a mobile phone of which a real screen-to-body ratio can be higher than 80% and that has an ultra-narrow frame design. In addition, a large quantity of mobile phones using a special-shaped screen design appear, and the mobile phones are referred to as special-shaped screen mobile phones for short.

Figure 1:
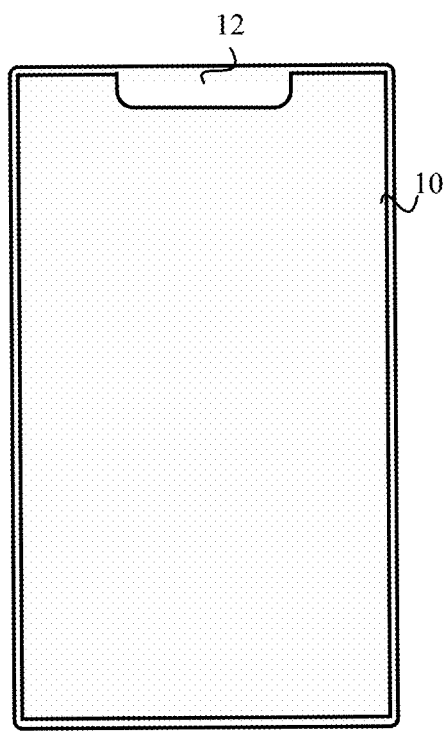
FIG. 1 is a schematic diagram of a mobile phone having a special-shaped screen according to an exemplary embodiment of the present disclosure.
Figure 2:
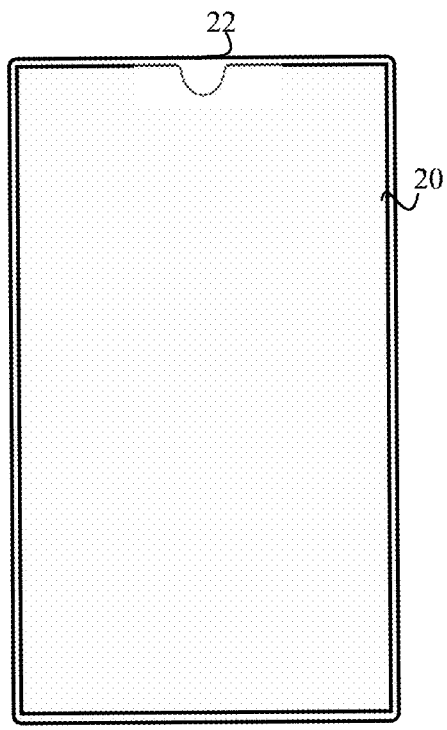
FIG. 2 is a schematic diagram of a mobile phone having a special-shaped screen according to an exemplary embodiment of the present disclosure.

The special-shaped screen mobile phone means that a touchscreen is of a shape other than a rectangle (and a rounded rectangle), for example, a shape in which there is a notch on an edge, or a shape in which there is a hole inside a screen. FIG. 1 shows a special-shaped screen mobile phone 10. A rounded-rectangle-shaped notch 12 is formed in the central part of a frame of a touchscreen of the special-shaped screen mobile phone 10. The notch 12 is configured to accommodate at least one sensor device of a distance sensor, a speaker, and a front-facing camera. FIG. 2 shows another special-shaped screen mobile phone 20. A water-drop-shaped notch 22 is formed in the central part of a frame of a touchscreen of the special-shaped screen mobile phone 20. The notch 22 is configured to accommodate at least one sensor device of a distance sensor, a speaker, and a front-facing camera. It can be seen from FIG. 1 and FIG. 2 that shapes of screens of the special-shaped screen mobile phones have indeterminacy, and shapes and sizes of notches set on special-shaped screen mobile phones by each manufacturer may be different from each other.

Because there is a notch on one edge of the special-shaped screen mobile phone, UI adaptation needs to be performed in a display process of a UI of the special-shaped screen mobile phone. In the related art, a mobile phone manufacturer displays a cross-striped portion on a touchscreen that corresponds to a notch part as a black status bar, and displays UIs of other applications in a rectangular zone below the black status bar. However, in this adaptation manner, a display surface of the application is compressed.

Figure 3:
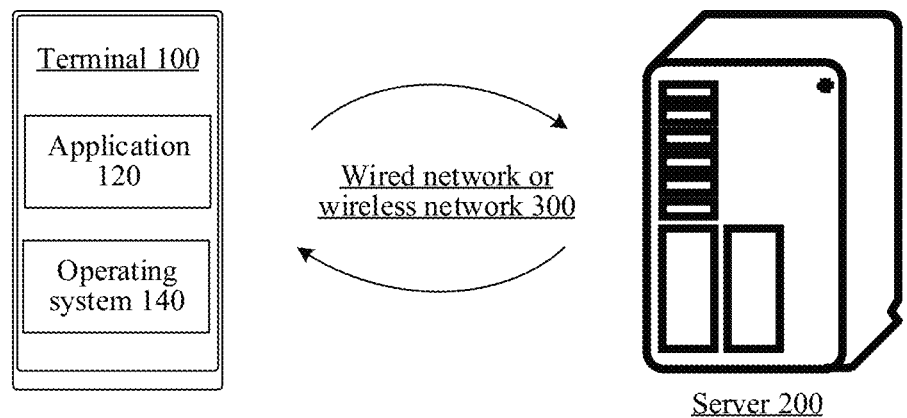
FIG. 3 is a block diagram of a computer system according to an exemplary embodiment of the present disclosure.

FIG. 3 is a block diagram of a computer system according to an exemplary embodiment of the present disclosure. The computer system includes a terminal 100 and a server 200.

The terminal 100 may be a portable laptop computer, a smartphone, a tablet computer, an ebook reader, a moving picture experts group audio layer III (MP3) player, a moving picture experts group audio layer IV (MP4) player, a smart television, a desktop computer, or the like. Optionally, the terminal 100 is installed with an application 120 and an operating system 140. Optionally, the terminal 100 is a terminal using a rechargeable battery as a power supply. Optionally, the terminal 100 is a terminal using a special-shaped screen, and the special-shaped screen means that the screen is of a shape other than a rectangle, for example, a notch screen, a water-drop screen, a folding screen, or a holed screen.

Figure 4:
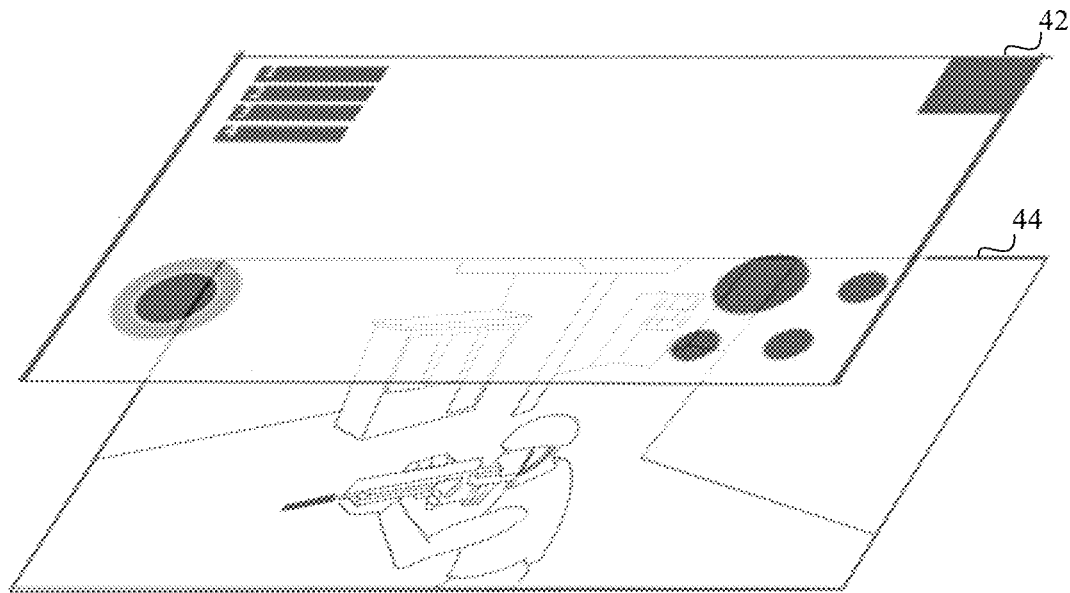
FIG. 4 is a schematic diagram of a user interface layer of an application according to an exemplary embodiment of the present disclosure.

The application program 120 is an application supporting a virtual environment. Optionally, the application 140 may be, for example, at least one of a multiplayer network mobile game application, a multiplayer network side game application, and a multiplayer online military exercise simulation program. Optionally, a description is provided by using an example in which the application 120 is a multiplayer online game client. In a multiplayer online game, a virtual environment based on supporting of a communication network is provided, an environment screen of the virtual environment includes one or more virtual characters, and a plurality of virtual characters are controlled by different users through multiplayer online game clients. Optionally, there are some virtual characters controlled by the server 200. As shown in FIG. 4, a UI displayed by the application 120 includes: a human-computer interaction control layer 42 and a virtual environment background layer 44. For example, the application is a multiplayer shooting game application. One or more human-computer interaction controls are displayed on the human-computer interaction control layer 42, and the human-computer interaction controls include touch controls performing human-computer interaction in at least one manner of clicking, sliding, or pressing. Optionally, the human-computer interaction control layer 42 includes at least one of: a mobile control, a shooting control, a squat control, a mini-map control, a backpack presentation control, a personal name transformation control, a firearm switch control, a missile selection control, a jump control, a crawling control, a continuous running control, an action presentation control, and a viewing angle rotation control; the virtual environment background layer 44 is an image obtained through observation on a 2.5D or 3D virtual environment from a viewing angle, and the 2.5D or 3D virtual environment includes one or more virtual characters, for example, at least one of a virtual soldier, a virtual animal, or a virtual anime character.

The operating system 140 provides a running environment to the application 120. Optionally, the operating system 140 runs a multiplayer online game, and displays a UI of the multiplayer online game on the terminal. The UI includes an environment screen of a virtual environment. The multiplayer online game runs in a normal running mode. Optionally, a user controls a virtual character to conduct activities. The activities include but are not limited to at least one of the following activities: completing a system task, participating in a team battle, spawning, training skills, competition, and feeding a pet.

The server 200 includes one or more servers. The server 200 is configured to provide a background service to the application. Optionally, the server 200 takes on primary computing work, and the terminal 100 takes on secondary computing work; alternatively, the server 200 takes on secondary computing work, and the terminal 100 takes on primary computing work; alternatively, collaborative computing is performed by using a distributed computing architecture between the server 200 and the terminal 100.

The communication network includes a wired network or wireless network 300. The terminal 100 is connected to the server 200 through the wired network or wireless network 300. Optionally, the wired network may be a metropolitan area network, a local area network, a fiber optical network, or the like; and the wireless network may be a mobile communication network or a wireless fidelity (Wi-Fi) network.

In some embodiments, the application running in the terminal 100 is a standalone application. In this case, the server 200 and the communication network 300 are optional components.

Figure 5:
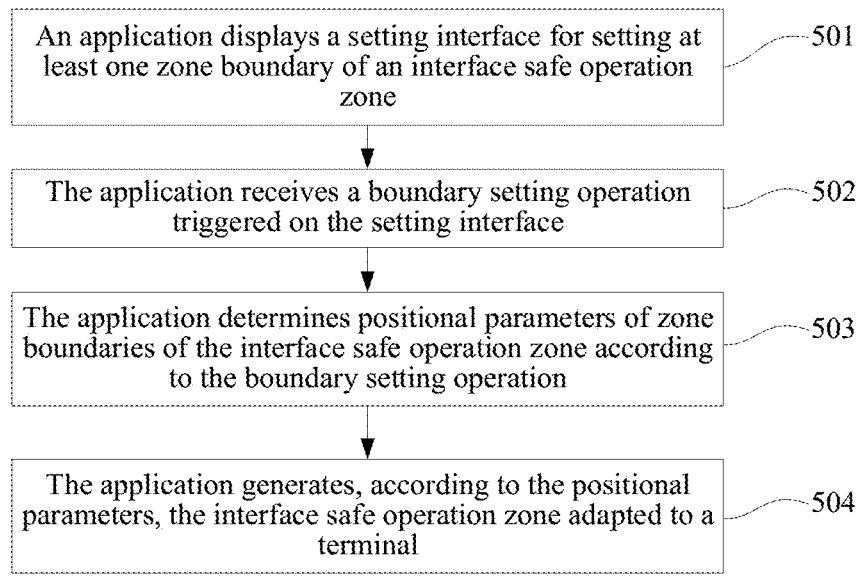
FIG. 5 is a flowchart of a display adaptation method for an application according to an exemplary embodiment of the present disclosure.

FIG. 5 is a flowchart of a display adaptation method for an application according to an exemplary embodiment of the present disclosure. One embodiment is described by using an example in which the method is applied to the terminal shown in FIG. 3. An application runs in the terminal. The method includes the following steps:

Step 501: The application displays a setting interface for an interface safe operation zone.

A UI of the application in an initial state may not be adapted to a display screen of the terminal. In the initial state, the UI displayed by the application may be displayed according to default display parameters. Alternatively, initialization display of the UI displayed by the application is performed according to a resolution of a screen of the terminal.

The application is an application in which there is a human-computer interaction control in the UI. As shown in FIG. 4, the UI of the application may include: a human-computer interaction control layer 42 and a virtual environment background layer 44. Exemplarily, the human-computer interaction control layer 42 is located on an upper layer of the virtual environment background layer 44.

In some other embodiments, the human-computer interaction control layer 42 is referred to as a head-up display (HUD) layer, and the virtual environment background layer 44 is referred to as a background layer. The virtual environment background layer 44 may be a virtual environment screen of a three-dimensional virtual environment, a virtual environment screen of a two-dimensional virtual environment, or the like.

The setting interface is used for setting at least one zone boundary of the interface safe operation zone. A user operation (e.g., interactive gesture operation) received at the interface safe operation zone is considered effective for the application and is processed to provide a corresponding response in the application; whereas a user operation received outside the interface safe operation zone may be ignored by the application. Optionally, the user operation received outside the interface safe operation zone may be processed by another application of the terminal (e.g., a shortcut operation predefined in the terminal). Optionally, the setting interface is provided by the application.

The interface safe operation zone is a zone used for displaying a human-computer interaction control responsive to one or more gesture operations in the application. Alternatively, the interface safe operation zone is an effective display zone of the human-computer interaction control. As shown in FIG. 4, the interface safe operation zone refers to a size of the human-computer interaction control layer 42, and the interface safe operation zone may be equal to or smaller than the virtual environment background layer 44. For example, on some terminals, the virtual environment background layer 44 occupies a display zone of an entire display screen, and the interface safe operation zone occupies a local zone of the entire display screen (or the entire human-computer interaction control layer 42). That is, the human-computer interaction control is displayed only on the local zone. The local zone may be smaller than the area of the entire display screen.

Optionally, the interface safe operation zone is of a rectangular shape, a rounded rectangle shape, or another shape. For example, the interface safe operation zone is of a rectangular shape. The interface safe operation zone includes four zone boundaries: an upper boundary, a left boundary, a right boundary, and a lower boundary. A display position of the human-computer interaction control shall be within the four zone boundaries.

When entering an adaptative matching mode, the application displays the setting interface of the interface safe operation zone. The setting interface is used for setting a boundary position of at least one zone boundary of the upper boundary, the left boundary, the right boundary, and the lower boundary of the interface safe operation zone.

Step 502: The application receives a boundary setting operation triggered on the setting interface.

The boundary setting operation is an operation of setting the zone boundaries of the interface safe operation zone. Optionally, the boundary setting operation is an operation of setting at least one zone boundary of the upper boundary, the lower boundary, the left boundary, and the right boundary of the interface safe operation zone. The boundary setting operation may be manually triggered by a user.

When the terminal uses a touchscreen, the boundary setting operation is triggered on the setting interface in a touch form; and when the terminal uses a peripheral mouse and keyboard, the boundary setting operation is triggered on the setting interface in forms of a cursor, an input box, and the like.

When a boundary line that can be dragged is displayed on the setting interface, the boundary setting operation may be a drag operation or a pinch operation; when plus and minus buttons related to a display position of a boundary line are displayed on the setting interface, the boundary setting operation may be a click operation on the plus and minus buttons; when a value setting box related to a display position of a boundary line is displayed on the setting interface, the boundary setting operation may be an input operation in the value setting box; when a slider bar or a slide disc related to a boundary line is displayed on the setting interface, the boundary setting operation may be a slide operation on the slider bar or the slide disc; and when the setting interface includes a control controlled by using gravity sensing, the boundary setting operation may be an operation triggered on a gravity sensor. A specific operation form of the boundary setting operation is not limited in this embodiment.

Step 503: The application determines positional parameters of the zone boundaries of the interface safe operation zone according to the boundary setting operation.

The positional parameters are parameters used for representing positions of the zone boundaries of the interface safe operation zone.

In some embodiments, the positional parameters are represented by using offset values of the four zone boundaries of the interface safe operation zone relative to four edges of the display screen. For example, the positional parameters include an upper offset value, a lower offset value, a left offset value, and a right offset value. The upper offset value represents an offset value of the upper boundary of the interface safe operation zone relative to an upper edge of the display screen, the lower offset value represents an offset value of the lower boundary of the interface safe operation zone relative to a lower edge of the display screen, the left offset value represents an offset value of the left boundary of the interface safe operation zone relative to a left edge of the display screen, and the right offset value represents an offset value of the right boundary of the interface safe operation zone relative to a right edge of the display screen.

In some other embodiments, the positional parameters may be represented by using coordinate values of the four zone boundaries of the interface safe operation zone. For example, a horizontal axis is an x axis, and a vertical axis is a y axis, then an upper boundary line may be represented as y=first value, a lower boundary line may be represented as y=second value, a left boundary line may be represented as x=third value, and a right boundary line may be represented as x=fourth value.

A specific form of the positional parameters is not limited in this embodiment.

Step 504: The application generates, according to the positional parameters, the interface safe operation zone adapted to the terminal.

After obtaining the positional parameters of the four zone boundaries of the interface safe operation zone, the application generates, according to the positional parameters of the four zone boundaries, the interface safe operation zone adapted to the terminal.

Optionally, the application determines the four zone boundaries (the upper boundary, the lower boundary, the left boundary, and the right boundary) of the interface safe operation zone according to the positional parameters, and generates human-computer interaction controls within the four zone boundaries of the interface safe operation zone in a form of scaling relative to default settings.

Based on the above, in the display adaptation method for an application provided in one embodiment, based on a boundary setting operation performed on a setting interface by a user, an application determines positional parameters of zone boundaries of an interface safe operation zone according to the boundary setting operation, and user-defined adaptation of the interface safe operation zone may be performed by a user. On one hand, the interface safe operation zone may be set to be as large as possible by the user; on the other hand, the setting of the interface safe operation zone does not affect display of a background layer of the application, and a display area of the background layer may be larger than an area of the interface safe operation zone, thereby resolving a problem that an adaptation method in the related art causes a limited field of view that can be displayed by a UI of an application and a relatively poor display effect.

Figure 7:
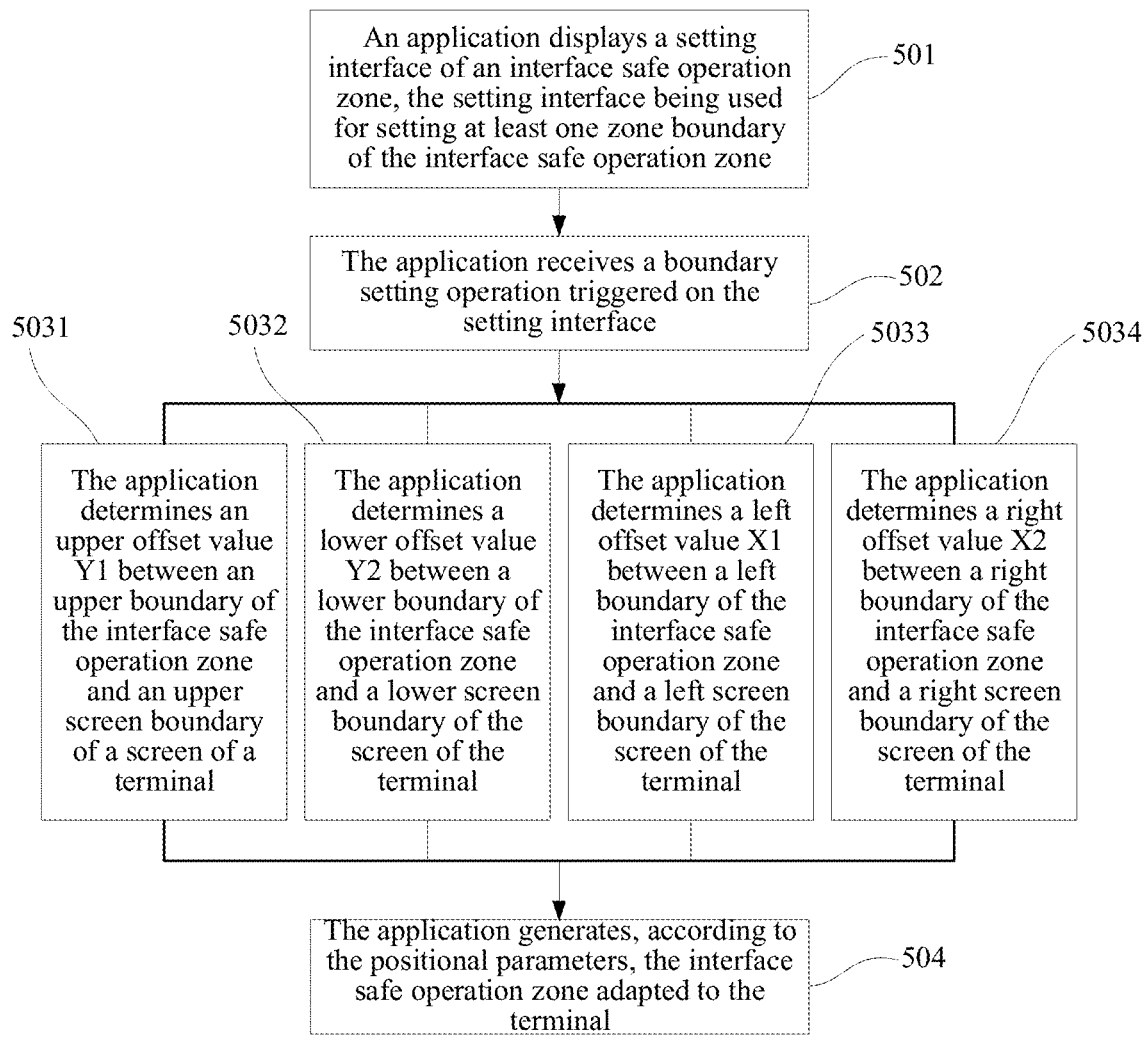
FIG. 7 is a flowchart of a display adaptation method for an application according to an exemplary embodiment of the present disclosure.

For example, the interface safe operation zone is of a rectangular shape. The interface safe operation zone includes an upper boundary, a lower boundary, a left boundary, and a right boundary. In an optional embodiment based on FIG. 4, the foregoing step 503 may alternatively be implemented as steps 5031 to 5034, as shown in FIG. 7:

Step 5031: The application determines an upper offset value Y1 between the upper boundary of the interface safe operation zone and an upper screen boundary of the screen of the terminal according to the boundary setting operation.

Figure 6:
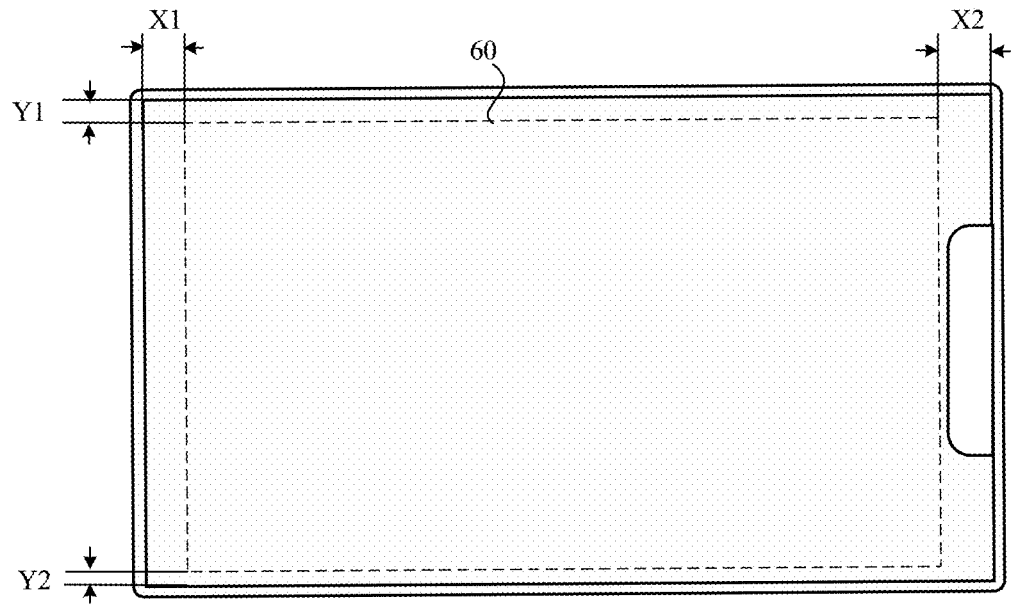
FIG. 6 is a schematic diagram of a setting interface according to an exemplary embodiment of the present disclosure.

A first control used for setting the upper boundary of the interface safe operation zone is displayed on the setting interface, and for example, the first control is an upper boundary line of which a position may be changed. When the first control receives the boundary setting operation of the user, the application determines the upper offset value Y1 of the interface safe operation zone 60 according to the boundary setting operation, as shown in FIG. 6.

Step 5032: The application determines a lower offset value Y2 between the lower boundary of the interface safe operation zone and a lower screen boundary of the screen of the terminal according to the boundary setting operation.

A second control used for setting the lower boundary of the interface safe operation zone is displayed on the setting interface, and for example, the second control is a lower boundary line of which a position may be changed. When the second control receives the boundary setting operation of the user, the application determines the lower offset value Y2 of the interface safe operation zone 60 according to the boundary setting operation, as shown in FIG. 6.

Step 5033: The application determines a left offset value X1 between the left boundary of the interface safe operation zone and a left screen boundary of the screen of the terminal according to the boundary setting operation.

A third control used for setting the left boundary of the interface safe operation zone is displayed on the setting interface, and for example, the third control is a left boundary line of which a position may be changed. When the third control receives the boundary setting operation of the user, the application determines the left offset value X1 of the interface safe operation zone 60 according to the boundary setting operation, as shown in FIG. 6.

Step 5034: The application determines a right offset value X2 between the right boundary of the interface safe operation zone and a right screen boundary of the screen of the terminal according to the boundary setting operation.

A fourth control used for setting the right boundary of the interface safe operation zone is displayed on the setting interface, and for example, the fourth control is a right boundary line of which a position may be changed. When the fourth control receives the boundary setting operation of the user, the application determines the right offset value X2 of the interface safe operation zone 60 according to the boundary setting operation, as shown in FIG. 6.

Optionally, the four steps: step 5301, step 5302, step 5303, and step 5304 are parallel steps, and any two of the four steps may be performed successively or simultaneously. The execution sequence of the four steps is not limited in this embodiment.

Optionally, according to different received boundary setting operations, only one, two, or three of the four steps: step 5301, step 5302, step 5303, and step 5304 may be performed in a single setting process. A quantity of performed steps of the four steps in a single setting process is not limited in this embodiment, and is determined according to a boundary setting operation actually triggered by the user.

Figure 8:
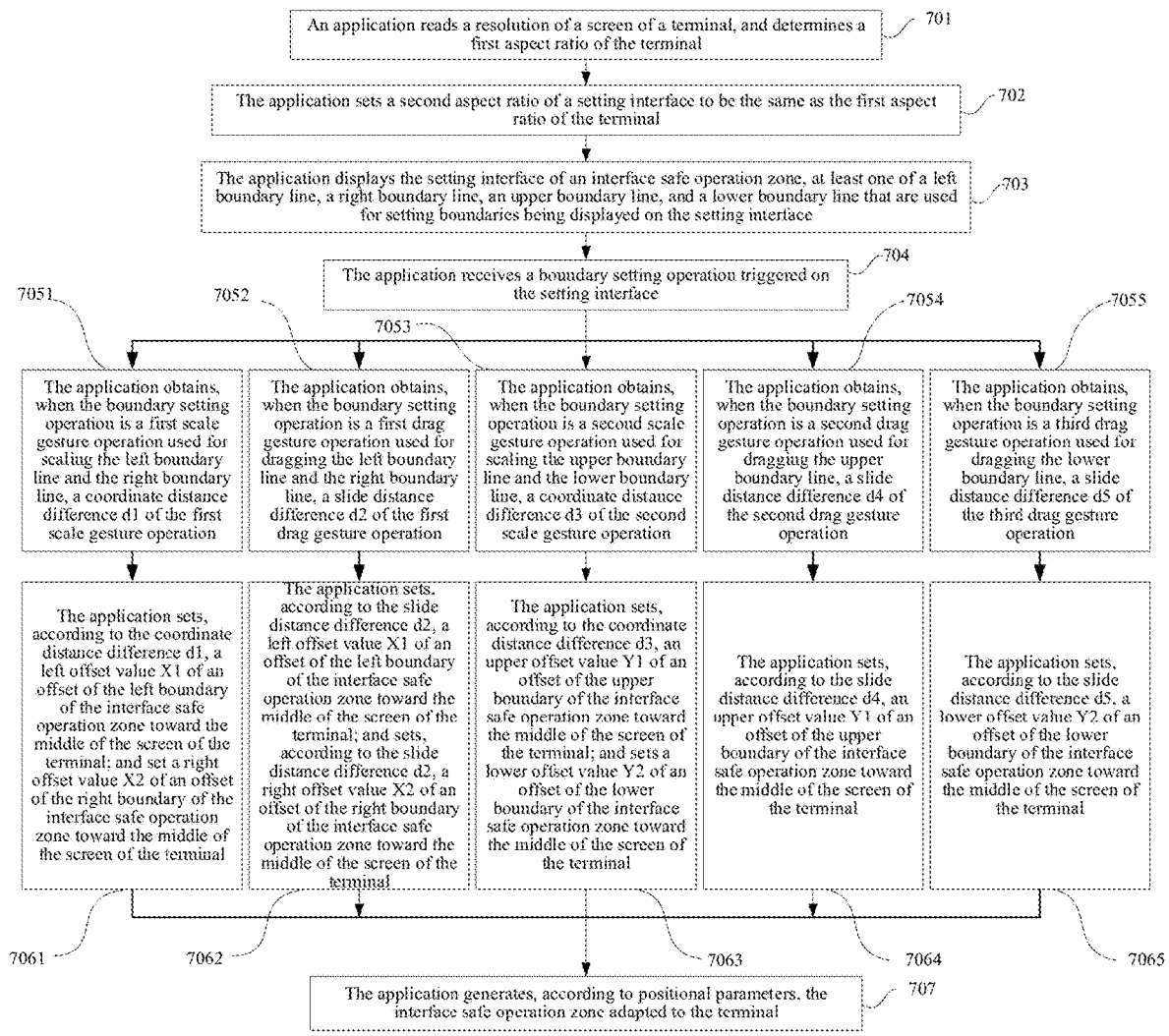
FIG. 8 is a flowchart of a display adaptation method for an application according to an exemplary embodiment of the present disclosure.

In some embodiments, the application is an application needing to be used in a landscape mode, and a notch of a special-shaped screen of the terminal is formed on an upper edge in a portrait mode. In most cases under the conditions, it is necessary to guide, in a landscape mode, the user to first set the left boundary and the right boundary of the interface safe operation zone, and then set the upper boundary and the lower boundary of the interface safe operation zone. FIG. 8 is a flowchart of a display adaptation method for an application according to another exemplary embodiment of the present disclosure. One embodiment is described by using an example in which the method is applied to the terminal 100 shown in FIG. 3. The method includes the following steps:

Step 701: The application reads a resolution of a screen of the terminal, and determines a first aspect ratio of the terminal.

The resolution of the screen is a pixel resolution on a display screen of the terminal. Different terminals may have different resolutions of screens.

When distinguished according to aspect ratios, mainstream resolutions of screens are divided into:

first, a resolution of a screen in a form of 16:9, and most smartphones have resolutions in the form of 16:9; and second, a resolution of a screen in a form of 4:3, and most tablet computers have resolutions of screens in the form of 4:3.

Step 702: The application sets a second aspect ratio of a setting interface to be the same as the first aspect ratio according to the first aspect ratio of the terminal.

For the purpose of enabling the setting interface to be adapted to the screen of the terminal, the application sets the second aspect ratio of the setting interface according to the first aspect ratio of the terminal.

When the resolution of the screen of the terminal is 16:9, the application sets the setting interface to a form of 16:9.

When the resolution of the screen of the terminal is 4:3, the application sets the setting interface to a form of 4:3.

Figure 9:
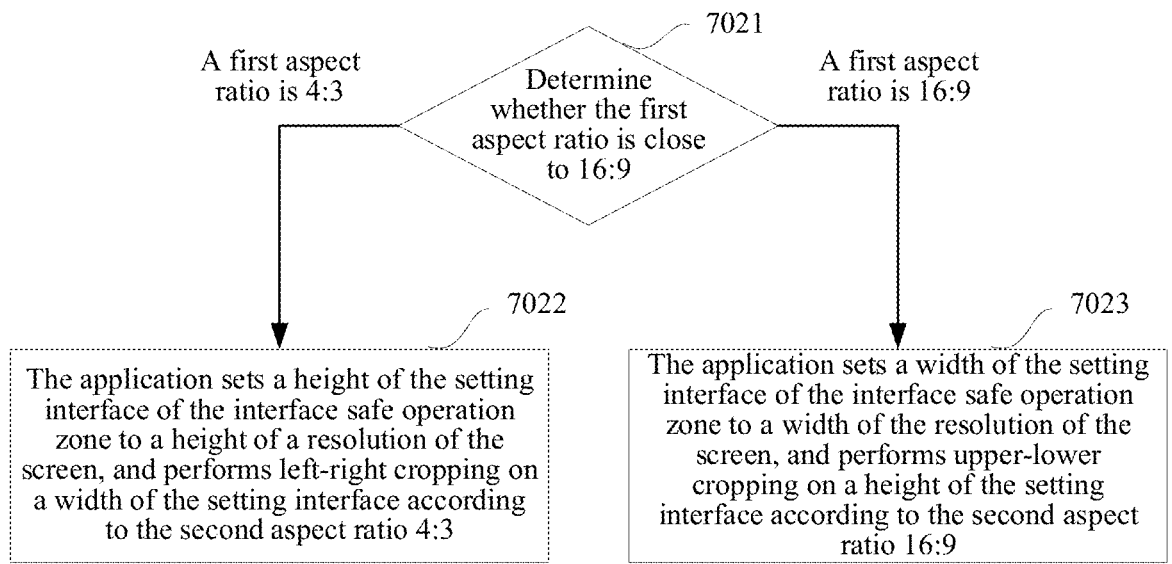
FIG. 9 is a partial flowchart of a display adaptation method for an application according to an exemplary embodiment of the present disclosure.

As shown in FIG. 9, this step optionally includes the following steps:

Step 7021: The application determines whether the first aspect ratio is close to 16:9.

When the first aspect ratio is close to 4:3, step 7022 is performed; and when the first aspect ratio is close to 16:9, step 7023 is performed.

Step 7022: The application sets a height of the setting interface of an interface safe operation zone to a height of the resolution of the screen, and performs left-right cropping on a width of the setting interface according to the second aspect ratio 4:3.

In an initial state, the setting interface has a default resolution, and the default resolution may be greater than or equal to a maximum resolution of a screen that is supported by the application. The setting interface is used for setting at least one zone boundary of the interface safe operation zone. Optionally, the setting interface is provided by the application.

When the resolution of the screen is 4:3, the application sets the height of the setting interface to the height of the resolution of the screen, and performs at least one of left cropping or right cropping on a width of the setting interface according to the second aspect ratio 4:3.

In one embodiment, descriptions are provided by using an example in which the application performs same-size cropping on an upper part and a lower part of the setting interface in the initial state according to the second aspect ratio 4:3.

Step 7023: The application sets a width of the setting interface of the interface safe operation zone to a width of the resolution of the screen, and performs upper-lower cropping on a height of the setting interface according to the second aspect ratio 16:9.

When the resolution of the screen is 16:9, the application sets the width of the setting interface to the width of the resolution of the screen, and performs at least one of upper cropping or lower cropping on the height of the setting interface according to the second aspect ratio 16:9.

In one embodiment, descriptions are provided by using an example in which the application performs same-size cropping on a left part and a right part of the setting interface in the initial state according to the second aspect ratio 16:9.

Step 703: The application displays the setting interface of the interface safe operation zone, at least one of a left boundary line, a right boundary line, an upper boundary line, and a lower boundary line that are used for setting zone boundaries being displayed on the setting interface.

After cropping the setting interface according to the second aspect ratio, the application displays the setting interface.

In some embodiments, four types of lines in total: the left boundary line, the right boundary line, the upper boundary line, and the lower boundary line that are used for setting the zone boundaries are simultaneously displayed on the setting interface.

In another embodiment, the left boundary line and the right boundary line are first displayed on the setting interface; and after settings of a left boundary and/or a right boundary of the interface safe operation zone are completed, the upper boundary line and the lower boundary line are then displayed on the setting interface.

In another embodiment, the upper boundary line and the lower boundary line are first displayed on the setting interface; and after settings of an upper boundary and/or a lower boundary of the interface safe operation zone are completed, the left boundary line and the right boundary line are then displayed on the setting interface.

Step 704: The application receives a boundary setting operation triggered on the setting interface by a user.

The boundary setting operation is an operation of setting the zone boundaries of the interface safe operation zone. Optionally, the boundary setting operation is an operation of setting at least one zone boundary of the upper boundary, the lower boundary, the left boundary, and the right boundary of the interface safe operation zone. The boundary setting operation may be manually triggered by a user.

Division is performed according to operation manners: the boundary setting operation may be a drag operation performed on a boundary line, or may be a pinch operation performed on the center of the setting interface in a direction (an up-down direction or a left-right direction).

Division is performed according to acting positions:

The boundary setting operation may be a drag operation acting on the left boundary line, a drag operation acting on the right boundary line, a drag operation acting on the upper boundary line, or a drag operation acting on the lower boundary line. When relative positions between the left boundary line and the right boundary line are bound, the boundary setting operation may be a drag operation simultaneously acting on the left boundary line and the right boundary line. When relative positions between the upper boundary line and the lower boundary line are bound, the boundary setting operation may be a drag operation simultaneously acting on the upper boundary line and the lower boundary line.

When relative positions between the left boundary line and the right boundary line are bound, the boundary setting operation may further be a first pinch operation simultaneously for the left boundary line and the right boundary line. When relative positions between the upper boundary line and the lower boundary line are bound, the boundary setting operation may be a second pinch operation simultaneously for the upper boundary line and the lower boundary line.

Step 7051: The application obtains, when the boundary setting operation is a first pinch operation used for scaling the left boundary line and the right boundary line, a coordinate distance difference d1 of the first pinch operation. Scaling a first line and a second line, as used herein, may refer to adjusting a relative distance between the two lines.

The first pinch operation may be an opening-closing operation performed by two fingers of the user in the center of the setting interface in a horizontal direction. In this case, two touch points are monitored on a touchscreen of the terminal, and a distance variation value of the two touch points in the horizontal direction is determined as the coordinate distance difference d1 of the first pinch operation.

Step 7061: The application sets, according to the coordinate distance difference d1, a left offset value X1 of an offset of the left boundary of the interface safe operation zone toward the middle of the screen of the terminal, and sets, according to the coordinate distance difference d1, a right offset value X2 of an offset of the right boundary of the interface safe operation zone toward the middle of the screen of the terminal.

Optionally, the coordinate distance difference d1 is in a positive correlation with the left offset value X1.

Optionally, the coordinate distance difference d1 is in a positive correlation with the right offset value X2.

In an embodiment, the application sets the left offset value and the right offset value according to the following formula:

$X1=X2=d1\times\alpha$, where $\alpha$ is a preset parameter.

Step 7052: The application obtains, when the boundary setting operation is a first drag operation of scaling the left boundary line and the right boundary line, a slide distance difference d2 of the first drag operation.

The first drag operation may be a drag operation of pressing on the left boundary line or the right boundary line. In this case, one continuously touched touch point is monitored on the touchscreen of the terminal, and a distance variation value of the continuously touched touch point in the horizontal direction is determined as the slide distance difference d2 of the first drag operation. In some embodiments, when the left boundary line is dragged, the right boundary line is adjusted in a symmetric manner. In some other embodiments, when the left boundary line is dragged, the position of the right boundary line is not changed.

Step 7062: The application sets, according to the slide distance difference d2, a left offset value X1 of an offset of the left boundary of the interface safe operation zone toward the middle of the screen of the terminal; and sets, according to the slide distance difference d2, a right offset value X2 of an offset of the right boundary of the interface safe operation zone toward the middle of the screen of the terminal.

Optionally, the slide distance difference d2 is in a positive correlation with the left offset value X1.

Optionally, the slide distance difference d2 is in a positive correlation with the right offset value X2.

In an embodiment, the application sets the left offset value and the right offset value according to the following formula:

$X1=X2=d2\times\beta$, where $\beta$ is a preset parameter.

Step 7053: The application obtains, when the boundary setting operation is a second pinch operation of scaling the upper boundary line and the lower boundary line, a coordinate distance difference d3 of the second pinch operation.

The second pinch operation may be an opening and closing operation performed by two fingers of the user in the center of the setting interface in a vertical direction. In this case, two touch points are monitored on a touchscreen of the terminal, and a distance variation value of the two touch points in the vertical direction is determined as the coordinate distance difference d3 of the second pinch operation.

Step 7063: The application sets, according to the coordinate distance difference d3, an upper offset value Y1 of an offset of the upper boundary of the interface safe operation zone toward the middle of the screen of the terminal; and sets, according to the coordinate distance difference d3, a lower offset value Y2 of an offset of the lower boundary of the interface safe operation zone toward the middle of the screen of the terminal.

Optionally, the coordinate distance difference d3 is directly proportional to the upper offset value Y1.

Optionally, the coordinate distance difference d3 is directly proportional to the lower offset value Y2.

In an embodiment, the application sets the left offset value and the right offset value according to the following formula:

$Y1=Y2=d3\times\alpha$, where $\alpha$ is a preset parameter.

Step 7054: The application obtains, when the boundary setting operation is a second drag operation of dragging the upper boundary line, a slide distance difference d4 of the second drag operation.

The second drag operation may be a drag operation of pressing on the upper boundary line. In this case, one continuously touched touch point is monitored on the touchscreen of the terminal, and a distance variation value of the continuously touched touch point in the horizontal direction is determined as the slide distance difference d4 of the second drag operation.

Step 7064: The application sets, according to the slide distance difference d4, an upper offset value Y1 of an offset of the upper boundary of the interface safe operation zone toward the middle of the screen of the terminal.

Optionally, the slide distance difference d4 is directly proportional to the upper offset value Y1.

In an embodiment, the application sets the upper offset value according to the following formula:

$Y1=d4\times\beta$, where $\beta$ is a preset parameter.

Step 7055: The application obtains, when the boundary setting operation is a third drag operation of dragging the lower boundary line, a slide distance difference d5 of the third drag operation.

The third drag operation may be a drag operation of pressing on the lower boundary line. In this case, one continuously touched touch point is monitored on the touchscreen of the terminal, and a distance variation value of the continuously touched touch point in the horizontal direction is determined as the slide distance difference d5 of the third drag operation.

Step 7065: The application sets, according to the slide distance difference d5, a lower offset value Y2 of an offset of the lower boundary of the interface safe operation zone toward the middle of the screen of the terminal.

Optionally, the slide distance difference d5 is directly proportional to the lower offset value Y2.

In an embodiment, the application sets the upper offset value according to the following formula:

$Y2=d5\times\beta$, where $\beta$ is a preset parameter.

In some embodiments, only one or at least one of five sets of the foregoing steps: step 7051 and step 7061, step 7052 and step 7062, step 7053 and step 7063, step 7054 and step 7064, and step 7055 and step 7065 may be performed. In some other embodiments, when at least two sets of steps are performed, the several sets of steps may be simultaneously performed, or some of the steps thereof may be first performed, and then the remaining other steps are performed.

Step 707: The application generates the interface safe operation zone adapted to the terminal according to positional parameters.

Based on the above, in the display adaptation method for an application provided in one embodiment, based on a boundary setting operation performed on a setting interface by a user, an application determines positional parameters of zone boundaries of an interface safe operation zone according to the boundary setting operation, and user-defined adaptation of the interface safe operation zone may be performed by a user. On one hand, the interface safe operation zone may be set to be as large as possible by the user; on the other hand, the setting of the interface safe operation zone does not affect display of a background layer of the application, and a display area of the background layer may be larger than an area of the interface safe operation zone, thereby resolving a problem that an adaptation method in the related art causes a limited field of view that can be displayed by a UI of an application and a relatively poor display effect.

In addition, the user performs the boundary setting operation according to types of screens of terminals, including a notch screen, a curved surface screen, a holed screen, and other non-mainstream screens; and adjusts the zone boundaries of the interface safe operation zone in real time, to obtain an interface safe operation zone with which the user is satisfied and that is adapted to a terminal, so that a problem that a manufacturer of an application needs to independently perform adaptation for a plurality of models with great development efforts can be resolved.

In addition, there is a high probability that the application needs to be displayed in a landscape mode. Therefore, binding setting is performed on a left boundary and a right boundary in the setting interface, so that a left offset value and a right offset value are the same offset value. Even for a mobile phone having a notch screen at the top of the mobile phone, the user flips the mobile phone in a landscape mode, for example, changes the top end of the mobile phone from a left palm direction to a right palm direction; and the interface safe operation zone can also be successfully correspondingly flipped without any adaptation problem, thereby ensuring a display adaptability of a UI of the application.

In addition, for some terminals, there is a curved surface edge (for example, a right edge) on one side edge, and there is no curved surface edge on the other side edge. Therefore, an upper boundary and a lower boundary of the interface safe operation zone being separately set can enable the setting method of the interface safe operation zone to be applicable to a plurality of types of terminals.

Figure 10:
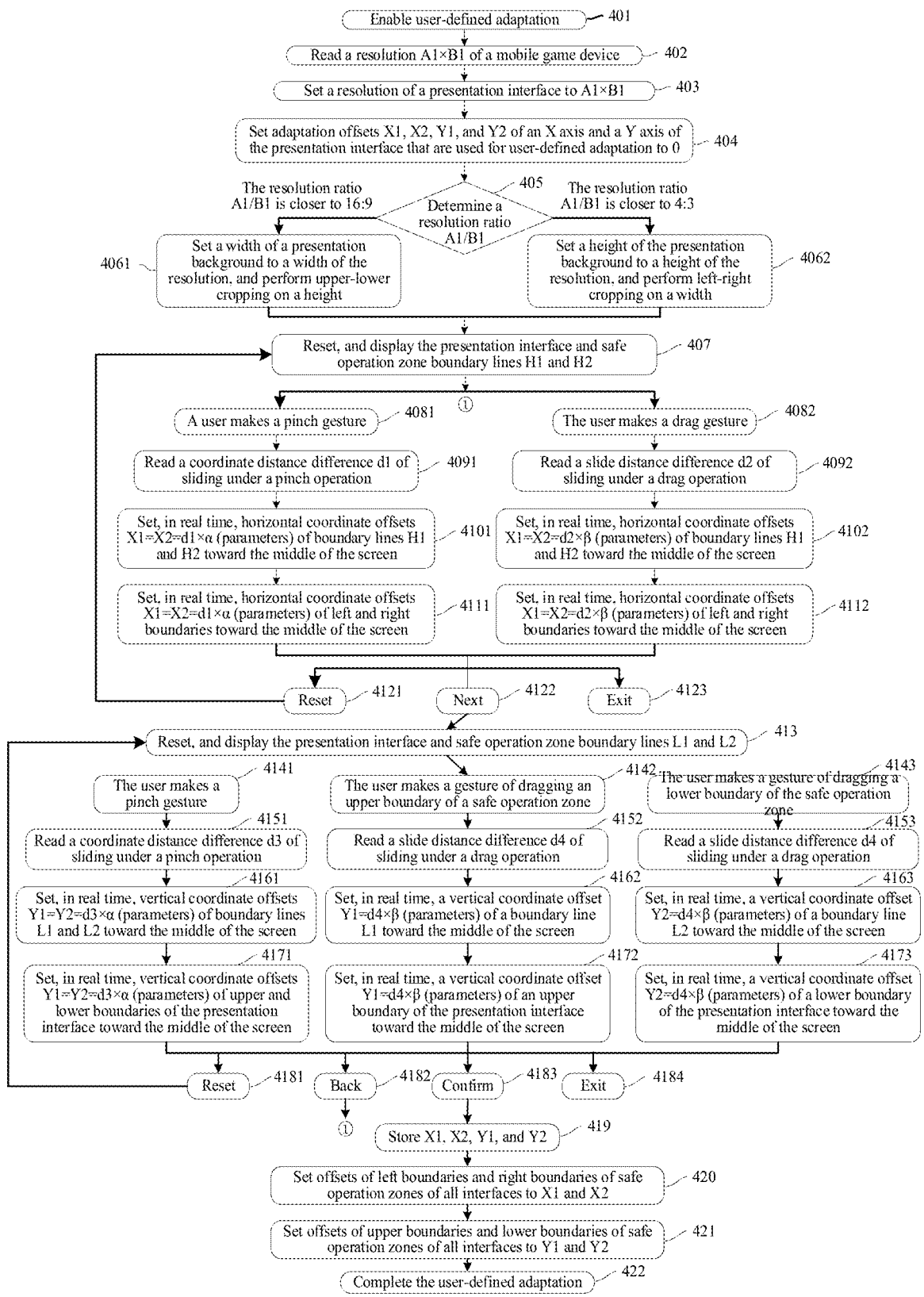
FIG. 10 is a flowchart of a display adaptation method for an application according to an exemplary embodiment of the present disclosure.

The display adaptation method for an application based on FIG. 1 is described below. For example, the terminal is a terminal running a mobile phone game program (referred to as a mobile game terminal for short). FIG. 10 is a flowchart of a display adaptation method for an application according to an exemplary embodiment of the present disclosure. The method includes the following steps:

Step 401: Enable a user-defined adaptation function.

A user starts a mobile game application. After the application obtains information of a login account, a "user-defined adaptation" control and an "exit" control are displayed on the background of the application.

Step 402: The application reads a resolution A1×B1 of a mobile game device.

The resolution of the mobile game device is a pixel resolution on a display screen, and is measured by using horizontal and vertical pixels. The resolution A1×B1 usually means that there are A1 pixels in a horizontal direction, and there are B1 pixels in a vertical direction.

Step 403: The application sets a resolution of a presentation interface to A1×B1.

In one embodiment, the presentation interface and the foregoing "setting interface" have the same definition.

Step 404: The application sets adaptation offsets X1, X2, Y1, and Y2 of an X axis and a Y axis of the presentation interface that are used for user-defined adaptation to 0.

The adaptation offsets of the X axis and the Y axis of the presentation interface are zone boundaries of the presentation interface, including a left boundary, a right boundary, an upper boundary, and a lower boundary. X1 is a linear distance between the left boundary of the presentation interface and a left screen boundary of the screen, X2 is a linear distance between the right boundary of the presentation interface and a right screen boundary of the screen, Y1 is a linear distance between the upper boundary of the presentation interface and an upper screen boundary of the screen, and Y2 is a linear distance between the lower boundary of the presentation interface and a lower screen boundary of the screen. X1, X2, Y1, and Y2 are set to 0 (in other words, they are initialized to 0), so that the zone boundaries of the presentation interface overlap the screen boundaries of the screen, as shown in FIG. 6.

Optionally, in some embodiments, step 404 may be performed after step 406.

Step 405: The application determines whether a resolution ratio A1/B1 is close to 16:9 or 4:3.

A resolution ratio of 16:9 is common for mobile phones, and a resolution ratio of 4:3 is common for tablet computers.

In some other embodiments, resolution ratios further include: 16:10 and 5:4. The resolution ratio of 16:10 is common for smart televisions and notebook computers. One embodiment is described by using an example in which the resolution ratios include 16:9 or 4:3, but a specific form of the resolution ratio is not limited.

Step 4061: The application sets a width of a presentation background to a width of the resolution, and performs upper-lower cropping on a height if the resolution ratio A1/B1 is close to 16:9.

The presentation background is a background displayed by the presentation interface. The background may be a current background of the application, or may be another background image.

In some embodiments, the "performing upper-lower cropping on a height" may be that an upper boundary and a lower boundary of the presentation background are cropped together, or one of the upper boundary and the lower boundary of the presentation background is cropped.

Step 4062: The application sets a height of the presentation background to a height of the resolution, and performs left-right cropping on a width if the resolution ratio A1/B1 is close to 4:3.

In some embodiments, the "performing left-right cropping on a width" may be that a left boundary and a right boundary of the presentation background are cropped together, or one of the left boundary and the right boundary of the presentation background is cropped.

Figure 11:
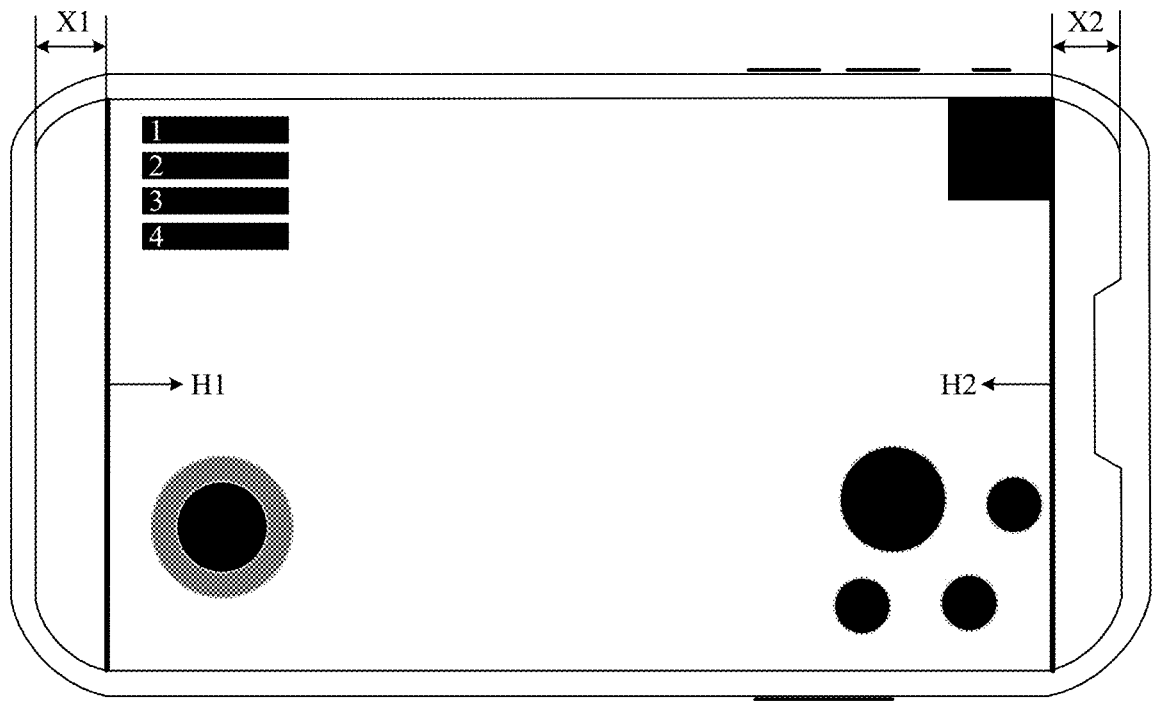
FIG. 11 is a schematic diagram of a presentation interface in a display adaptation method for an application according to an exemplary embodiment of the present disclosure.

Step 407: The application prompts to reset the application, and displays the presentation interface and security zone boundary lines H1 and H2 of the presentation interface. FIG. 11 shows the boundary lines H1 and H2 in the presentation interface in the display adaptation method for an application. Positions of the boundary lines H1 and H2 may be changed by a drag gesture or a pinch gesture.

Figure 12:
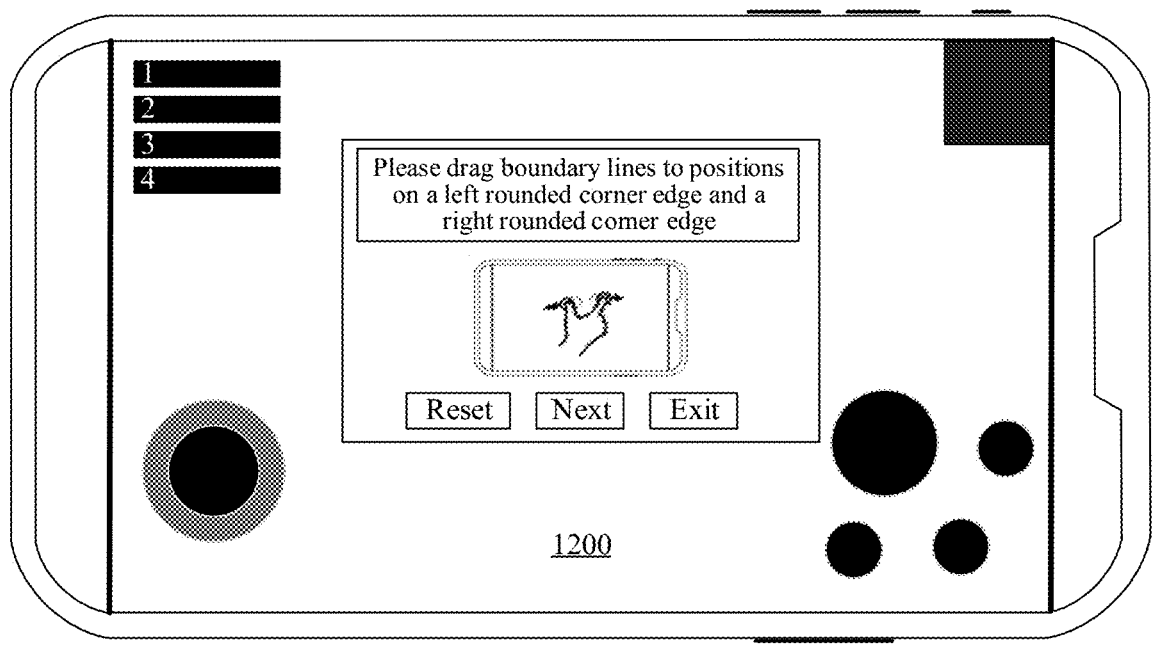
FIG. 12 is a schematic diagram of a pinch operation on a presentation interface in a display adaptation method for an application according to an exemplary embodiment of the present disclosure.

FIG. 12 is a schematic diagram of the presentation interface after setting, by the application in real time, the left boundary and the right boundary of the presentation interface to shift toward the middle of the screen of the terminal is completed, and shows a pinch operation of the user on the presentation interface. The specific method includes the following steps:

Step 4081: The user makes a pinch gesture. In other words, a pinch gesture is detected by the terminal (e.g., the application of the terminal).

The pinch gesture may act on any zone of the presentation interface, and scaling may be performed in any angle.

Optionally, the user makes a pinch gesture, and touch points between fingers and the presentation interface may be points on the scale boundary lines H1 and H2, or may be any two points on the presentation interface.

Step 4091: The application reads a coordinate distance difference d1 of sliding under a pinch operation.

The "coordinate distance difference d1" is measured and calculated by using a slide distance difference of the touch point.

Optionally, for the slide distance difference of the touch point, a slide distance difference of either of the two touch points is measured and calculated, or slide distance differences of the two touch points are simultaneously measured and calculated.

Optionally, the slide distance difference of the touch point may be measured and calculated by using a variation value of the touch point in a horizontal direction.

Step 4101: The application sets, in real time, the security zone boundary lines H1 and H2 of the presentation interface to simultaneously shift toward the middle of the screen of the terminal by X1 and X2 in horizontal coordinates, where X1=X2=d1×α, and α is a parameter.

Step 4111: The application sets, in real time, the left and right boundaries of the presentation interface to shift toward the middle of the screen of the terminal by X1 and X2 in horizontal coordinates, where X1=X2=d1×α, and α is a parameter.

Step 4082: The user makes a drag gesture. In other words, a drag gesture is detected by the terminal.

Optionally, the drag gesture acts on the security zone boundary lines H1 and H2 of the presentation interface.

In some embodiments, the user may click or double-click the security zone boundary lines H1 and H2 of the presentation interface, to move them to suitable positions.

Step 4092: The application reads a slide distance difference d2 of sliding under a drag operation.

Optionally, the drag gesture of the user is a drag operation of pressing on the boundary lines H1 and H2. One continuously touched touch point is monitored on a touchscreen of the terminal, and the slide distance difference d2 is determined by measuring and calculating a distance variation value of the continuously touched touch point in the horizontal direction.

Optionally, the drag gesture of the user is a drag operation of clicking or double-clicking the boundary line H1 or boundary line H2, to move the boundary line H1 or boundary line H2 to suitable positions; the boundary line H1 or boundary line H2 is placed by clicking; and the slide distance difference d2 is determined by measuring and calculating a distance variation value of the touch point in a horizontal direction before and after the drag operation.

Step 4102: The application sets, in real time, the security zone boundary lines H1 and H2 of the presentation interface to shift toward the middle of the screen of the terminal by X1 and X2 in horizontal coordinates, where X1=X2=d2×β, and β is a parameter.

Step 4112: The application sets, in real time, the left and right boundaries of the presentation interface to simultaneously shift toward the middle of the screen of the terminal by X1 and X2 in horizontal coordinates, where X1=X2=d2×β, and β is a parameter.

As shown in FIG. 12, after step 4111 or step 4112 is completed, an interface 1200 displayed by the application includes a "reset" control, a "next" control, and an "exit" control.

Step 4121: The user clicks the "reset" control, the application will enter step 407 to repeat the foregoing step, and the user may set the left boundary and the right boundary of the presentation interface for a plurality of times.

Step 4122: The user clicks the "next" control, the application will enter step 413, and the user sets an upper interface and a lower interface of the presentation interface.

Step 4123: The user clicks "exit", and the application will exit the user-defined adaptation.

Step 4121, step 4122, and step 4123 are single option steps, and only one thereof can be performed.

Figure 13:
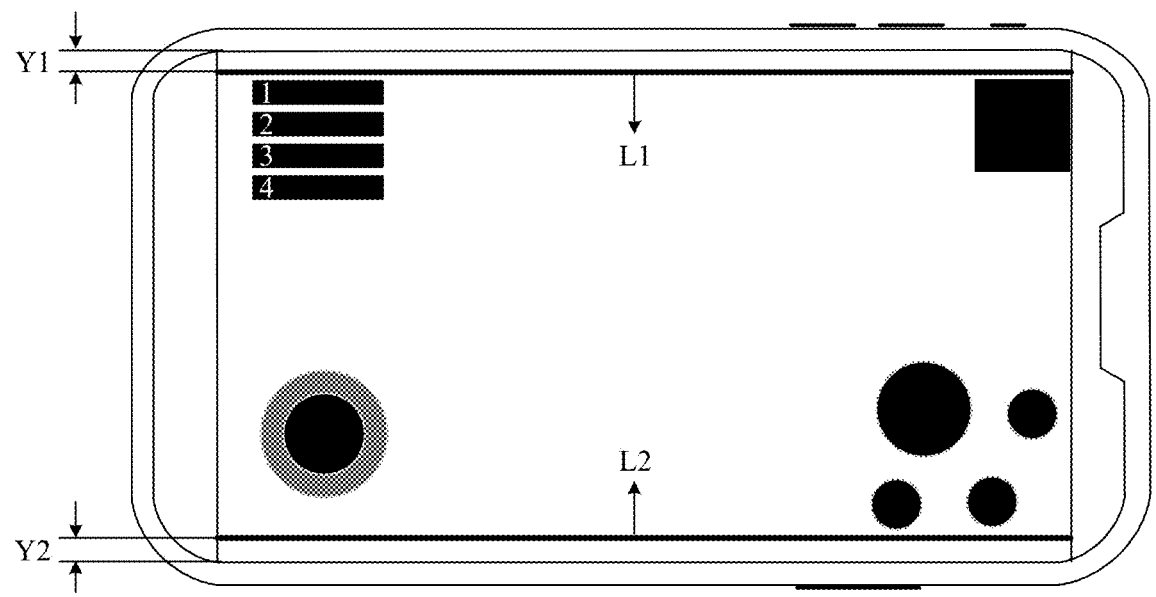
FIG. 13 is a schematic diagram of a presentation interface in a display adaptation method for an application according to an exemplary embodiment of the present disclosure.

Step 413: After completing settings of the left boundary and the right boundary of the presentation interface, the application resets the presentation interface, and displays boundary lines L1 and L2 of a security zone of the presentation interface. FIG. 13 shows the boundary lines L1 and L2 in the presentation interface in the display adaptation method for an application.

Figure 14:
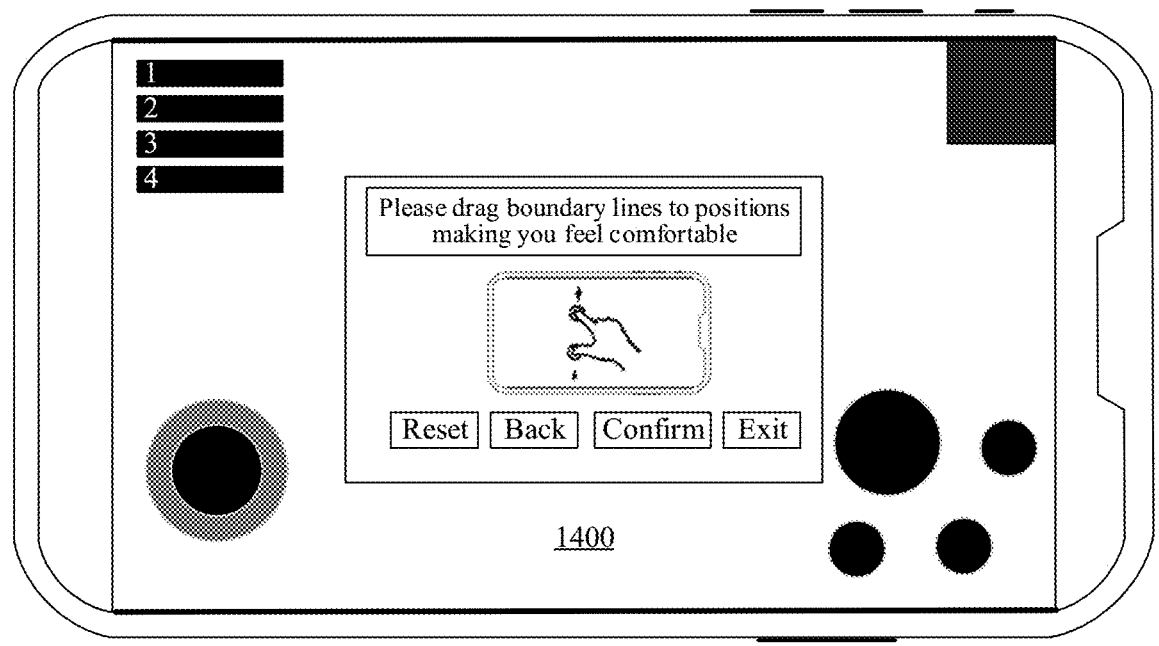
FIG. 14 is a schematic diagram of a pinch operation on a presentation interface in a display adaptation method for an application according to an exemplary embodiment of the present disclosure.

FIG. 14 is a schematic diagram of the presentation interface after setting, by the application in real time, the upper boundary and the lower boundary of the presentation interface to shift toward the middle of the screen of the terminal is completed, and shows a gesture operation of the user for scaling the upper boundary and the lower boundary on the presentation interface. The specific method includes the following steps:

Step 4141: The user makes a pinch gesture. A pinch gesture on the presentation interface is detected.

The pinch gesture may act on any zone of the presentation interface, and scaling may be performed in any angle.

Optionally, the user makes a pinch gesture, and touch points between fingers and the presentation interface may be points on the scale boundary lines L1 and L2, or may be any two points on the presentation interface.

Step 4151: The application reads a coordinate distance difference d3 of sliding under a pinch operation.

Step 4161: The application sets, in real time, the security zone boundary lines L1 and L2 of the presentation interface to simultaneously shift toward the middle of the screen of the terminal by Y1 and Y2 in vertical coordinates, where $Y1=Y2=d3\times\alpha$, and $\alpha$ is a parameter.

Step 4171: The application sets, in real time, the upper boundary and the lower boundary of the presentation interface to simultaneously shift toward the middle of the screen of the terminal by Y1 and Y2 in vertical coordinates, where $Y1=Y2=d3\times\alpha$, and $\alpha$ is a parameter.

Step 4142: The application receives a drag operation if the user makes a gesture of dragging the upper boundary line of the security zone of the presentation interface.

Step 4152: The application reads a slide distance difference d4 of sliding under a drag operation.

Step 4162: The application sets, in real time, the upper boundary line L1 of the presentation interface to shift toward the middle of the screen of the terminal by Y1 in a vertical coordinate, where $Y1=d4\times\beta$, and $\beta$ is a parameter.

Step 4172: The application sets, in real time, the upper boundary of the presentation interface to shift toward the middle of the screen of the terminal by Y1 in a vertical coordinate, where $Y1=d3\times\beta$, and $\beta$ is a parameter.

Step 4173: The application receives a drag operation if the user makes a gesture of dragging the lower boundary line of the security zone of the presentation interface.

Step 4153: The application reads a slide distance difference d4 of sliding under a drag operation.

Step 4162: The application sets, in real time, the upper boundary line L1 of the presentation interface to shift toward the middle of the screen of the terminal by Y1 in a vertical coordinate, where $Y1=d4\times\beta$, and $\beta$ is a parameter.

Step 4172: The application sets, in real time, the upper boundary of the presentation interface to shift toward the middle of the screen of the terminal by Y2 in a vertical coordinate, where $Y2=d3\times\beta$, and $\beta$ is a parameter.

As shown in FIG. 14, after step 4171, step 4172, or step 4173 is completed, an interface 1400 displayed by the application includes a "reset" control, a "back" control, a "confirm" control and an "exit" control.

Step 4181: The user clicks the "reset" control, the application will enter step 413, and then repeats the foregoing steps.

Step 4182: The user clicks the "back" control, the application will enter step 407, and then repeats the foregoing steps.

Step 4183: The user clicks the "next" control, and the application will enter step 419.

Step 4184: The user clicks the "exit" control, and the application will exit the user-defined adaptation.

Step 4181, step 4182, step 4183, and step 4184 are single option steps, and only one thereof can be performed.

Step 419: Store X1, X2, Y1, and Y2.

Optionally, the application will set offsets X1, X2, Y1, and Y2 of the presentation interface toward the middle of the screen of the terminal, and store them in information of the user logging in to the application.

Optionally, the application will set offsets X1, X2, Y1, and Y2 of the presentation interface toward the middle of the screen of the terminal, and store them in a memory of the terminal.

Step 420: The application sets left boundary offsets and right boundary offsets of security zones of all interfaces to X1 and X2.

Step 421: The application sets upper boundary offsets and lower boundary offsets of the security zones of all the interfaces to Y1 and Y2.

In some embodiments, the interfaces of the application include an information interface, a setting interface, a map interface, a duplicate interface, and the like.

Step 422: The application completes user-defined adaptation of interface safe operation zones.

Figure 15:
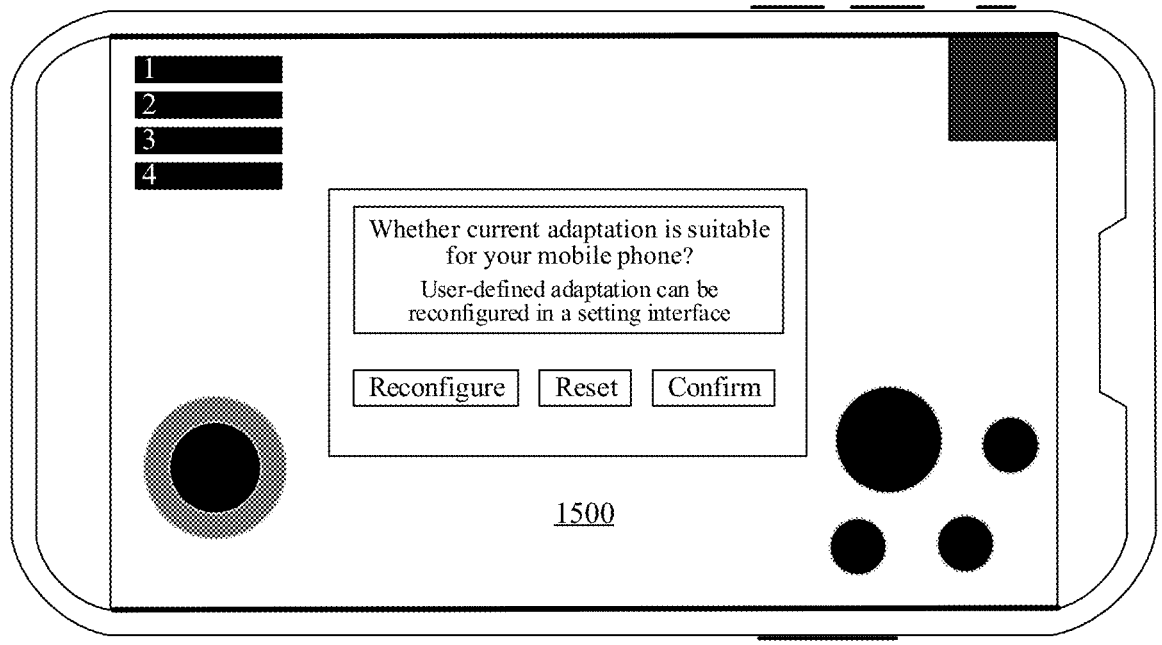
FIG. 15 is a schematic diagram of a screen interface in a display adaptation method for an application according to an exemplary embodiment of the present disclosure.

FIG. 15 is a schematic diagram of a screen interface of the terminal after user-defined adaptation of interface safe operation zones is completed. An interface 1500 includes a "reconfigure" control, a "reset" control, and a "confirm" control.

The user clicks the "reconfigure" control, and the application enters step 407.

The user clicks the "reset" control, and the application enters step 413.

The user clicks the "confirm" control, and user-defined adaptation of the interface safe operation zones is completed.

Based on the above, in the display adaptation method for an application provided in one embodiment, based on a boundary setting operation performed on a presentation interface by a user, an application determines positional parameters of zone boundaries of an interface safe operation zone according to the boundary setting operation, and user-defined adaptation of the interface safe operation zone may be performed by a user. On one hand, the interface safe operation zone may be set to be as large as possible by the user; on the other hand, the setting of the interface safe operation zone does not affect display of a background layer of the application, and a display area of the background layer may be larger than an area of the interface safe operation zone, thereby resolving a problem that an adaptation method in the related art causes a limited field of view that can be displayed by a UI of an application and a relatively poor display effect. In addition, the user performs the boundary setting operation according to types of screens of terminals, including a notch screen, a curved surface screen, and other non-mainstream screens; and adjusts the zone boundaries of the interface safe operation zone in real time, to obtain an interface safe operation zone with which the user is satisfied and that is adapted to a terminal, so that a problem that a manufacturer of an application needs to independently perform adaptation for a plurality of models with great development efforts can be resolved.

In addition, the user may adjust a size and a position of the interface safe operation zone in real time, so that a display position of a human-computer interaction control on the interface safe operation zone can be more suitable for a model and use habits of the user, to satisfy use requirements of different users.

Apparatus embodiments of the present disclosure are described below. Reference may be made to the foregoing method embodiments in a one-to-one correspondence with the apparatus embodiments for technical details that are not described in detail in the apparatus embodiments.

Figure 16:
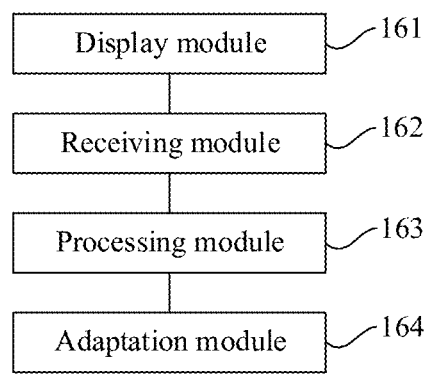
FIG. 16 is a block diagram of a display adaptation apparatus for an application according to an exemplary embodiment of the present disclosure.

FIG. 16 is a block diagram of a display adaptation apparatus for an application according to an exemplary embodiment of the present disclosure. The apparatus may be implemented as the entire or a part of a terminal by using software, hardware, or a combination thereof. The apparatus includes:

a display module 161, configured to display a setting interface of an interface safe operation zone, the setting interface being used for setting at least one zone boundary of the interface safe operation zone, and the interface safe operation zone being a zone used for displaying a human-computer interaction control in the application;

a receiving module 162, configured to receive a boundary setting operation triggered on the setting interface;

a processing module 163, configured to determine positional parameters of zone boundaries of the interface safe operation zone according to the boundary setting operation; and an adaptation module 164, configured to generate, according to the positional parameters, the interface safe operation zone adapted to a terminal.

Figure 17:
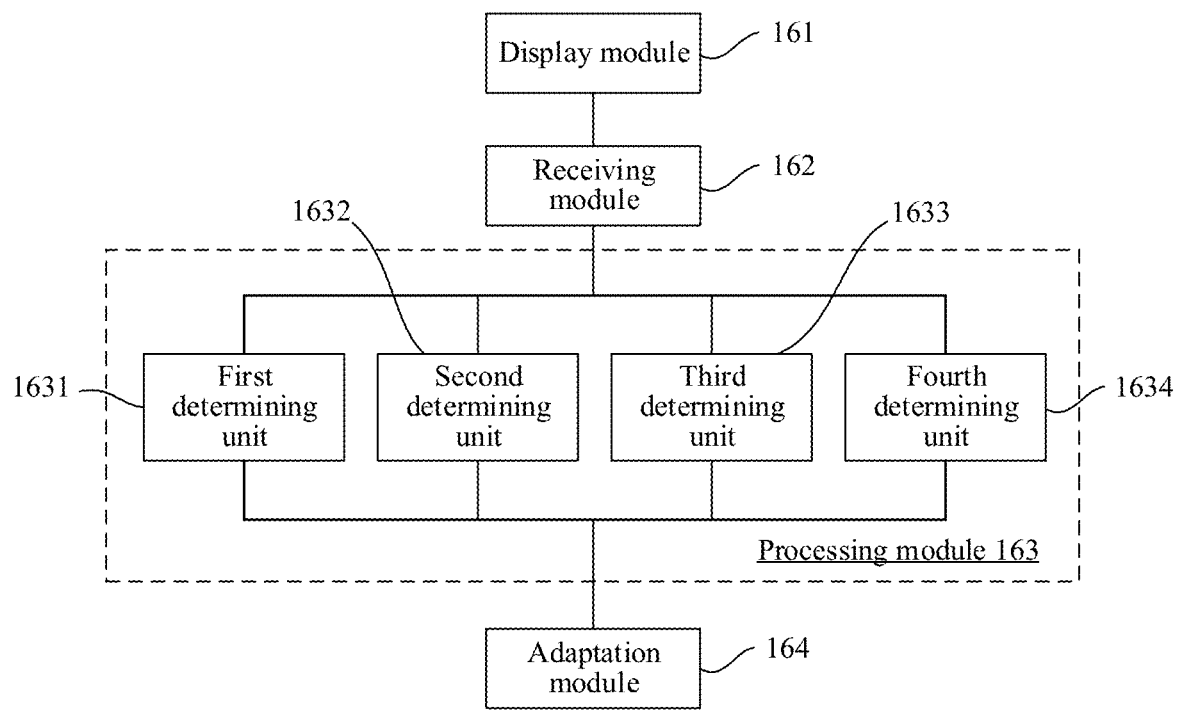
FIG. 17 is a block diagram of a display adaptation apparatus for an application according to an exemplary embodiment of the present disclosure.

In an optional embodiment, as shown in FIG. 17, the processing module 163 is configured to determine offset values between the zone boundaries of the interface safe operation zone and screen boundaries of a screen of the terminal according to the boundary setting operation received by the receiving module 162.

The processing module 163 includes:

a first determining unit 1631, configured to determine an upper offset value Y1 between an upper boundary of the interface safe operation zone and an upper screen boundary of the screen of the terminal according to the boundary setting operation received by the receiving module 162;

a second determining unit 1632, configured to determine a lower offset value Y2 between a lower boundary of the interface safe operation zone and a lower screen boundary of the screen of the terminal according to the boundary setting operation received by the receiving module 162;

a third determining unit 1633, configured to determine a left offset value X1 between a left boundary of the interface safe operation zone and a left screen boundary of the screen of the terminal according to the boundary setting operation received by the receiving module 162; and a fourth determining unit 1634, configured to determine a right offset value X2 between a right boundary of the interface safe operation zone and a right screen boundary of the screen of the terminal according to the boundary setting operation received by the receiving module 162.

Figure 18:
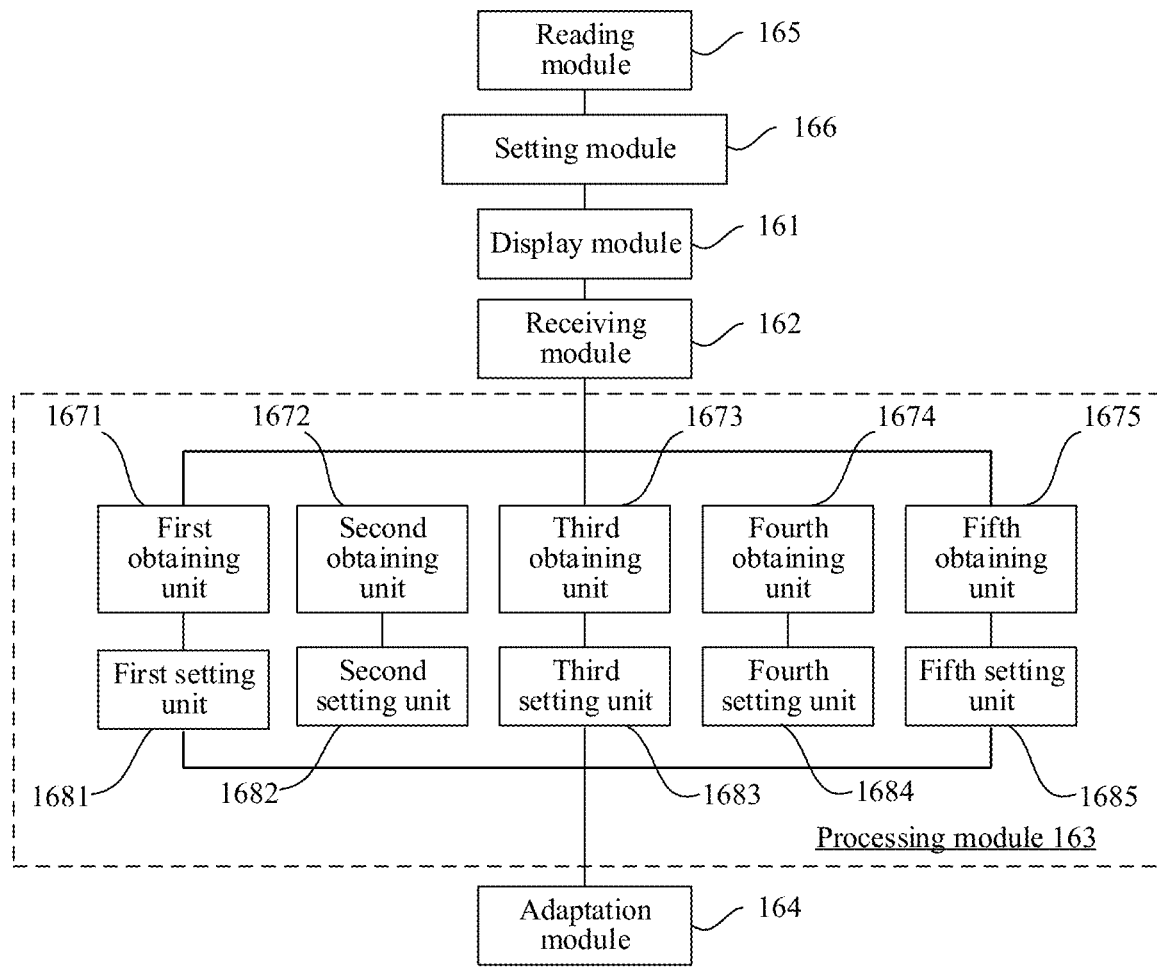
FIG. 18 is a block diagram of a display adaptation apparatus for an application according to an exemplary embodiment of the present disclosure.

In an optional embodiment, as shown in FIG. 18, the processing module 163 further includes:

a first obtaining unit 1671, configured to obtain a coordinate distance difference d1 of the first pinch operation;

a second obtaining unit 1672, configured to obtain a slide distance difference d2 of the first drag operation;

a third obtaining unit 1673, configured to obtain a coordinate distance difference d3 of the second pinch operation;

a fourth obtaining unit 1674, configured to obtain a slide distance difference d4 of the second drag operation;

a fifth obtaining unit 1675, configured to obtain a slide distance difference d5 of the third drag operation;

a first setting unit 1681, configured to set, according to the coordinate distance difference d1 obtained by the first obtaining unit 1671, the left offset value X1 of an offset of the left boundary of the interface safe operation zone toward the middle of the screen of the terminal; and configured to set, according to the coordinate distance difference d1, the right offset value X2 of an offset of the right boundary of the interface safe operation zone toward the middle of the screen of the terminal;

a second setting unit 1682, configured to set, according to the slide distance difference d2 obtained by the second obtaining unit 1672, the left offset value X1 of an offset of the left boundary of the interface safe operation zone toward the middle of the screen of the terminal; and set, according to the slide distance difference d2, the right offset value X2 of an offset of the right boundary of the interface safe operation zone toward the middle of the screen of the terminal;

a third setting unit 1683, configured to set, according to the coordinate distance difference d3 obtained by the third obtaining unit 1673, the upper offset value Y1 of an offset of the upper boundary of the interface safe operation zone toward the middle of the screen of the terminal; and set, according to the coordinate distance difference d3, the lower offset value Y2 of an offset of the lower boundary of the interface safe operation zone toward the middle of the screen of the terminal;

a fourth setting unit 1684, configured to set, according to the slide distance difference d4 obtained by the fourth obtaining unit 1674, the upper offset value Y1 of an offset of the upper boundary of the interface safe operation zone toward the middle of the screen of the terminal; and a fifth setting unit 1685, configured to set, according to the slide distance difference d5 obtained by the fifth obtaining unit 1675, the lower offset value Y2 of an offset of the lower boundary of the interface safe operation zone toward the middle of the screen of the terminal.

Before the display module 161, the apparatus further includes:

a reading module 165, configured to read a resolution of the screen of the terminal, and determine a first aspect ratio of the terminal according to the resolution of the screen; and a setting module 166, configured to set a second aspect ratio of the setting interface the same as the first aspect ratio according to the first aspect ratio.

Figure 19:
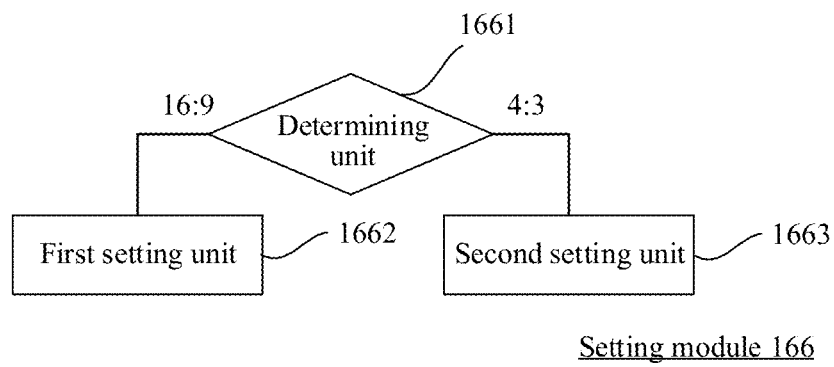
FIG. 19 is a block diagram of a setting module of a display adaptation apparatus for an application according to an exemplary embodiment of the present disclosure.

The setting module 166 includes: a determining unit 1661, a first setting unit 1662, and a second setting unit 1663, as shown in FIG. 19.

The determining unit 1661 is configured to determine whether the first aspect ratio is close to one of 4:3 and 16:9.

The first setting unit 1662 is configured to set a width of the setting interface of the interface safe operation zone to a width of the resolution of the screen in a case that the first aspect ratio is 4:3, and perform upper-lower cropping on a height of the setting interface according to the second aspect ratio 4:3.

The second setting unit 1663 is configured to set a height of the setting interface of the interface safe operation zone to a height of the resolution of the screen in a case that the second aspect ratio is 16:9, and perform left-right cropping on a width of the setting interface according to the second aspect ratio 16:9.

Based on the above, in the display adaptation apparatus for an application provided in one embodiment, based on a boundary setting operation performed on a setting interface by a user, an application determines positional parameters of zone boundaries of an interface safe operation zone according to the boundary setting operation, and user-defined adaptation of the interface safe operation zone may be performed by a user. On one hand, the interface safe operation zone may be set to be as large as possible by the user; on the other hand, the setting of the interface safe operation zone does not affect display of a background layer of the application, and a display area of the background layer may be larger than an area of the interface safe operation zone, thereby resolving a problem that an adaptation method in the related art causes a limited field of view that can be displayed by a UI of an application and a relatively poor display effect.

Figure 20:
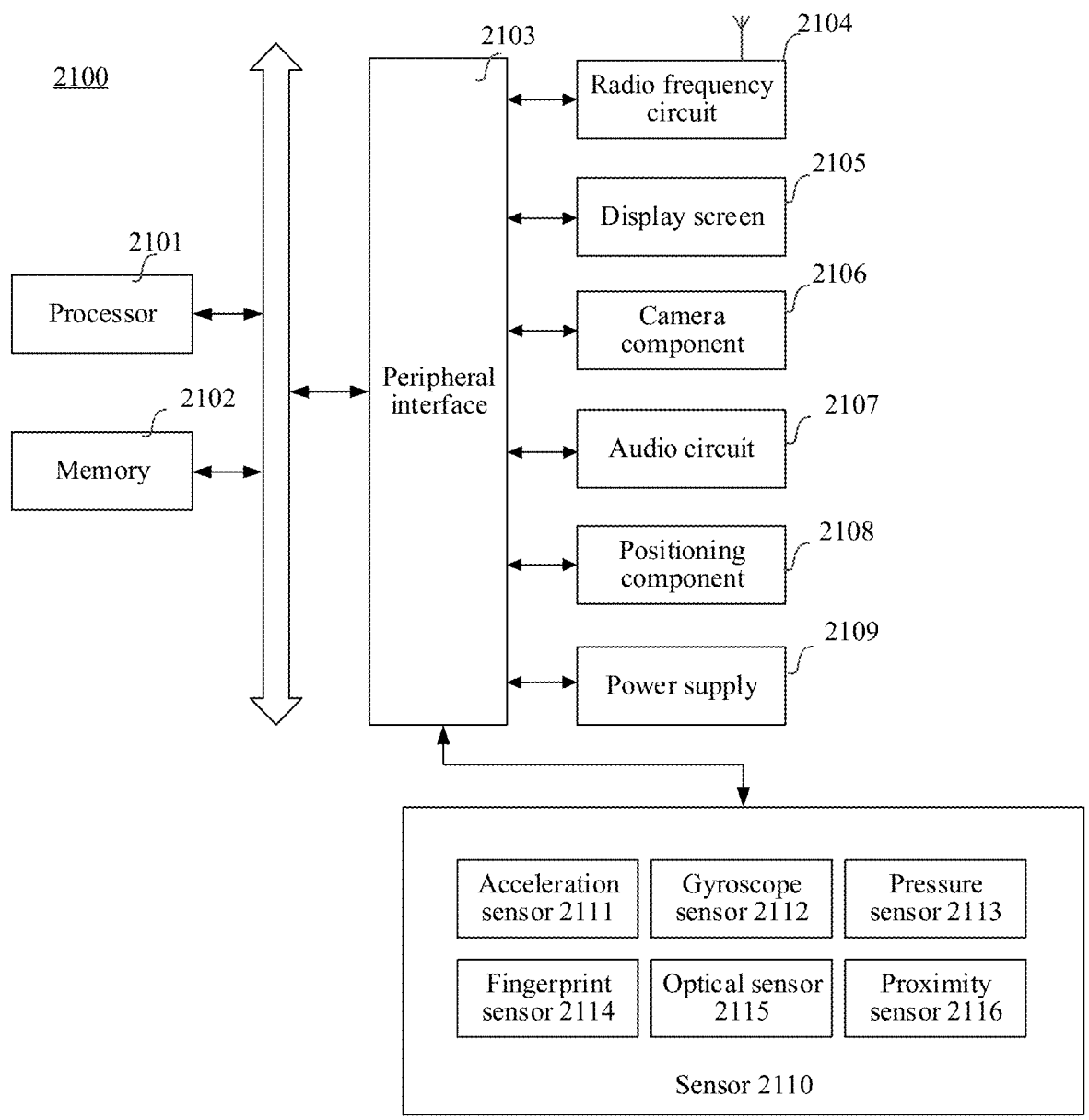
FIG. 20 is a structural block diagram of a terminal in a display adaptation method for an application according to an exemplary embodiment of the present disclosure.

FIG. 20 is a structural block diagram of a terminal 2100 according to an exemplary embodiment of the present disclosure. The terminal 2100 may be a smartphone, a tablet computer, a Moving Picture Experts Group Audio Layer III (MP3) player, a Moving Picture Experts Group Audio Layer IV (MP4) player, a notebook computer, or a desktop computer. The terminal 2100 may also be referred to as user equipment, a portable terminal, a laptop terminal, a desktop terminal, or another name.

Generally, the terminal 2100 includes a processor 2101 and a memory 2102.

The processor 2101 may include one or more processing cores, for example, the processor 2101 may be a 4-core processor or an 8-core processor. The processor 2101 may be implemented by using at least one hardware form of digital signal processing (DSP), a field-programmable gate array (FPGA), and a programmable logic array (PLA). The processor 2101 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 2101 may be integrated with a graphics processing unit (GPU). The GPU is configured to be responsible for rendering and drawing content that a display screen needs to display. In some embodiments, the processor 2101 may further include an artificial intelligence (AI) processor. The AI processor is configured to process a calculation operation related to machine learning.

The memory 2102 may include one or more computer-readable storage media. The computer-readable storage medium may be non-transient. The memory 2102 may further include a high-speed random access memory and a non-volatile memory such as one or more magnetic disk storage devices and a flash storage device. In some embodiments, the non-transitory computer-readable storage medium in the memory 2102 is configured to store at least one instruction, the at least one instruction being executed by the processor 2101 to implement the display adaptation method for an application provided in the method embodiments of the present disclosure.

In some embodiments, the terminal 2100 further optionally includes a peripheral interface 2103 and at least one peripheral. The processor 2101, the memory 2102, and the peripheral interface 2103 may be connected through a bus or a signal cable. Each peripheral may be connected to the peripheral interface 2103 through a bus, a signal cable, or a circuit board. Specifically, the peripheral includes: at least one of a radio frequency (RF) circuit 2104, a touch display screen 2105, a camera component 2106, an audio circuit 2107, a positioning component 2108, and a power supply 2109.

The peripheral interface 2103 may be configured to connect at least one peripheral related to input/output (I/O) to the processor 2101 and the memory 2102. In some embodiments, the processor 2101, the memory 2102, and the peripheral interface 2103 are integrated into the same chip or circuit board. In some other embodiments, any one or two of the processor 2101, the memory 2102, and the peripheral interface 2103 may be implemented on an independent chip or circuit board, and the implementation is not limited in this embodiment.

The RF circuit 2104 is configured to receive and transmit an RF signal, also referred to as an electromagnetic signal. The RF circuit 2104 communicates with a communication network and another communication device by using the electromagnetic signal. The RF circuit 2104 converts an electric signal into an electromagnetic signal for transmission, or converts a received electromagnetic signal into an electric signal. Optionally, the radio frequency circuit 2104 includes: an antenna system, an RF transceiver, one or more amplifiers, a tuner, an oscillator, a digital signal processor, a codec chip set, a subscriber identity module card, and the like. The radio frequency circuit 2104 may communicate with another terminal through at least one wireless communication protocol. The wireless communication protocol includes, but is not limited to: a metropolitan area network, generations of mobile communication networks (2G, 3G, 4G, and 5G), a wireless local area network and/or a Wi-Fi network. In some embodiments, the RF circuit 2104 may also include a circuit related to near field communication (NFC). This is not limited in the present disclosure.

The display screen 2105 is configured to display a UI. The UI may include a graph, a text, an icon, a video, and any combination thereof. When the display screen 2105 is a touch display screen, the display screen 2105 is further capable of acquiring a touch signal on or above a surface of the display screen 2105. The touch signal may be inputted to the processor 2101 for processing as a control signal. In this case, the touch display screen 2105 may be further configured to provide a virtual button and/or a virtual keyboard, which is also referred to as a soft button and/or a soft keyboard. In some embodiments, there may be one touch display screen 2105, disposed on a front panel of the terminal 2100. In some other embodiments, there may be at least two display screens 2105, disposed on different surfaces of the terminal 2100 respectively or in a folded design. In still other embodiments, the display screen 2105 may be a flexible display screen, disposed on a curved surface or a folded surface of the terminal 2100. Even, the touch display screen 2105 may be further set in a non-rectangular irregular pattern, namely, a special-shaped screen. The touch display screen 2105 may be configured by using materials such as a liquid crystal display (LCD), an organic light-emitting diode (OLED), and the like.

The camera component 2106 is configured to acquire an image or a video. Optionally, the camera component 2106 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 2106 may further include a flash. The flash may be a single color temperature flash, or may be a double color temperature flash. The double color temperature flash is a combination of a warm light flash and a cold light flash, and may be used for light compensation under different color temperatures.

The audio circuit 2107 may include a microphone and a speaker. The microphone is configured to: acquire sound waves of a user and an environment, and convert the sound waves into electrical signals and input the electrical signals into the processor 2101 for processing, or input the electrical signals into the RF circuit 2104 to implement speech communication. For the purpose of stereo collection or noise reduction, there may be a plurality of microphones, disposed at different parts of the terminal 2100 respectively. The microphone may be further an array microphone or an omnidirectional collection microphone. The speaker is configured to convert electrical signals from the processor 2101 or the RF circuit 2104 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 2107 may further include an earphone jack.

The positioning component 2108 is configured to locate a current geographic location of the terminal 2100, to implement a navigation or a location based service (LBS). The positioning component 2108 may be a positioning component based on the Global Positioning System (GPS) of the United States, the COMPASS System of China, the GLONASS System of Russia, or the GALILEO System of the European Union.

The power supply 2109 is configured to supply power for various components in the terminal 2100. The power supply 2109 may be an alternating current, a direct current, a disposable battery, or a rechargeable battery. When the power supply 2109 includes the rechargeable battery, the rechargeable battery may be a wired rechargeable battery or a wireless rechargeable battery. The rechargeable battery may be further configured to support a fast charge technology.

In some embodiments, the terminal 2100 further includes one or more sensors 2110. The one or more sensors 2110 include, but are not limited to, an acceleration sensor 2111, a gyroscope sensor 2112, a pressure sensor 2113, a fingerprint sensor 2121, an optical sensor 2115, and a proximity sensor 2116.

The acceleration sensor 2111 may detect accelerations on three coordinate axes of a coordinate system established with the terminal 2100. For example, the acceleration sensor 2111 may be configured to detect components of gravity acceleration on the three coordinate axes. The processor 2101 may control, according to a gravity acceleration signal collected by the acceleration sensor 2111, the touch display screen 2105 to display the UI in a transverse view or a longitudinal view. The acceleration sensor 2111 may be further configured to collect game or user motion data.

The gyroscope sensor 2112 may detect a body direction and a rotation angle of the terminal 2100. The gyroscope sensor 2112 may cooperate with the acceleration sensor 2111 to collect a 3D action by the user on the terminal 2100. The processor 2101 may implement the following functions according to the data collected by the gyroscope sensor 2112: motion sensing (such as changing the UI according to a tilt operation of the user), image stabilization during shooting, game control, and inertial navigation.

The pressure sensor 2113 may be disposed on a side frame of the terminal 2100 and/or a lower layer of the touch display screen 2105. When the pressure sensor 2113 is disposed on the side frame of the terminal 2100, a holding signal of the user to the terminal 2100 may be detected, and left/right hand identification and a quick operation may be performed by the processor 2101 according to the holding signal collected by the pressure sensor 2113. When the pressure sensor 2113 is disposed on the lower layer of the touch display screen 2105, the processor 2101 controls an operable control on the UI interface according to a pressure operation of the user on the touch display screen 2105. The operable control includes at least one of a button control, a scroll bar control, an icon control and a menu control.

The fingerprint sensor 2121 is configured to collect a user's fingerprint, and the processor 2101 identifies a user's identity according to the fingerprint collected by the fingerprint sensor 2121, or the fingerprint sensor 2121 identifies a user's identity according to the collected fingerprint. When the identity of the user is identified as a trusted identity, the processor 2101 authorizes the user to perform a related sensitive operation. The sensitive operation includes unlocking a screen, viewing encrypted information, downloading software, payment, changing settings, and the like. The fingerprint sensor 2121 may be disposed on a front surface, a back surface, or a side surface of the terminal 2100. When a physical button or a vendor logo is disposed on the terminal 2100, the fingerprint sensor 2121 may be integrated together with the physical button or the vendor logo.

The optical sensor 2115 is configured to collect ambient light intensity. In an embodiment, the processor 2101 may control the display brightness of the touch display screen 2105 according to the ambient light intensity collected by the optical sensor 2115. Specifically, when the ambient light intensity is relatively high, the display brightness of the touch display screen 2105 is turned up. When the ambient light intensity is relatively low, the display brightness of the touch display screen 2105 is turned down. In another embodiment, the processor 2101 may further dynamically adjust shooting parameters of the camera component 2106 according to the ambient light intensity collected by the optical sensor 2115.

The proximity sensor 2116, also referred to as a distance sensor, is usually disposed on a front panel of the terminal 2100. The proximity sensor 2116 is configured to collect a distance between a user and the front surface of the terminal 2100. In an embodiment, when the proximity sensor 2116 detects that the distance between the user and the front surface of the terminal 2100 gradually becomes small, the touch display screen 2105 is controlled by the processor 2101 to switch from a screen-on state to a screen-off state. When the proximity sensor 2116 detects that the distance between the user and the front surface of the terminal 2100 gradually becomes large, the touch display screen 2105 is controlled by the processor 2101 to switch from the screen-off state to the screen-on state.

A person skilled in the art may understand that the structure shown in FIG. 20 does not constitute a limitation on the terminal 2100, and the terminal may include more or fewer components than those shown in the figure, or some components may be combined, or a different component deployment may be used.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types.

The memory further includes one or more programs. The one or more programs are stored in the memory and configured to be executed by one or more processors. The one or more programs contain instructions used for implementing the foregoing display adaptation method for an application.

An embodiment of the present disclosure further provides a computer-readable storage medium, the storage medium storing at least one instruction, at least one program, and a code set or an instruction set, and the at least one instruction, the at least one program, and the code set or the instruction set being loaded and executed by a processor to implement the display adaptation method for an application according to the foregoing embodiments.

The present disclosure further provides a computer program product, and the computer program product, when run on a computer, causes the computer to perform the display adaptation method for an application according to the foregoing method embodiments.

After considering the specification and practicing the present disclosure, a person skilled in the art can readily think of other implementations of the present disclosure. The present disclosure is intended to cover any variations, uses or adaptation of the present disclosure following the general principles of the present disclosure, and includes the well-known knowledge and conventional technical means in the art and undisclosed in the present disclosure. The specification and the embodiments are merely considered as examples, and the actual scope and the spirit of the present disclosure are pointed out by the following claims.

It is to be understood that the present disclosure is not limited to the accurate structures that are described above and that are shown in the accompanying drawings, and modifications and changes may be made without departing from the scope of the present disclosure. The scope of the present disclosure is limited by the appended claims only.

What is claimed is:

1. A display adaptation method for an application executed by a terminal, comprising:

displaying a background layer of an application running on the terminal, the background layer includes one or more of a virtual soldier, a virtual animal, or a virtual anime character;

displaying a setting interface for setting zone boundaries of an interface safe operation zone, wherein the zone boundaries include a left boundary, a right boundary, an upper boundary, and a lower boundary, and wherein a four-sided area defined between the left, the right, the upper, and the lower boundaries of the zone boundaries and screen boundaries of a screen of the terminal is inactive and is not a zone used for displaying a human-computer interaction control responsive to one or more gesture operations in the application;

setting the interface safe operation zone to be functionally and visually separate from and independent of the background layer of the application, wherein the background layer is greater in area than the interface safe operation zone;

receiving a boundary setting operation triggered on the setting interface;

determining offset values between of the zone boundaries of the interface safe operation zone and the screen boundaries of the screen of the terminal according to the boundary setting operation, wherein the offset values include a left offset value X1 between the left boundary of the interface safe operation zone and a left screen boundary of the screen of the terminal, a right offset value X2 between the right boundary of the interface safe operation zone and a right screen boundary of the screen of the terminal, an upper offset value Y1 between the upper boundary of the interface safe operation zone and an upper screen boundary of the screen of the terminal, and a lower offset value Y2 between the lower boundary of the interface safe operation zone and a lower screen boundary of the screen of the terminal; and generating, according to the offset values, the interface safe operation zone adapted to the terminal.

2. The method according to claim 1, wherein the displaying a setting interface comprises:

reading a resolution of the screen of the terminal;

determining a first aspect ratio of the terminal according to the resolution of the screen; and displaying the setting interface for the interface safe operation zone according to the first aspect ratio, a second aspect ratio of the setting interface being the same as the first aspect ratio.

3. The method according to claim 2, wherein the displaying the setting interface of the interface safe operation zone according to the first aspect ratio comprises: setting a width of the setting interface as a width of the resolution of the screen in a case that the first aspect ratio is 4:3;

performing upper-lower cropping on a height of the setting interface according to the second aspect ratio 4:3; and displaying the cropped setting interface at the second aspect ratio of 4:3.

4. The method according to claim 2, wherein the displaying the setting interface of the interface safe operation zone according to the first aspect ratio comprises:

setting a height of the setting interface as a height of the resolution of the screen in a case that the second aspect ratio is 16:9;

performing left-right cropping on a width of the setting interface according to the second aspect ratio 16:9; and displaying the cropped setting interface at the second aspect ratio of 16:9.

5. The method according to claim 1, further comprising:

determining a resolution of the setting interface;

adjusting the offset value X1, X2, Y1, or Y2 further according to the resolution of the setting interface.

6. The method according to claim 1, wherein the boundary setting operation include a pinch operation or a drag operation, and wherein the offset values are determined by one or more of:

obtaining a coordinate distance difference of the pinch operation, and setting the left offset value X1, the right offset value X2, the upper offset value Y1, or the lower offset value Y2 according to the coordinate distance difference, wherein two touch points via the pinch operation are monitored and a distance between the two touch points is the coordinate distance difference; or obtaining a slide distance difference of the drag operation, and setting the left offset value X1, the right offset value X2, the upper offset value Y1, or the lower offset value Y2 according to the slide distance difference, wherein one continuously touched touch point is monitored and a distance travelled by the one continuously touched touch point in the horizontal direction is the slide distance difference.

7. The method according to claim 6, wherein the coordinate distance difference is the distance between the two touch points in a horizontal direction or a vertical direction.

8. The method according to claim 1, wherein the boundary setting operation is a click operation on plus and minus buttons.

9. The method according to claim 1, wherein the setting interface includes a control controlled by using gravity sensing, and the boundary setting operation is an operation triggered on a gravity sensor.

10. A display adaptation apparatus for an application, comprising: a memory and a processor coupled to the memory, the processor being configured to:

display a background layer of an application running on the terminal, the background layer includes one or more of a virtual soldier, a virtual animal, or a virtual anime character;

display a setting interface for setting zone boundaries of an interface safe operation zone, wherein the zone boundaries include a left boundary, a right boundary, an upper boundary, and a lower boundary, and wherein a four-sided area defined between the left, the right, the upper, and the lower boundaries of the zone boundaries and screen boundaries of a screen of the terminal is inactive and is not a zone used for displaying a human-computer interaction control responsive to one or more gesture operations in the application;

set the interface safe operation zone to be functionally and visually separate from and independent of the background layer of the application, wherein the background layer is greater in area than the interface safe operation zone;

receive a boundary setting operation triggered on the setting interface;

determine offset values between of the zone boundaries of the interface safe operation zone and the screen boundaries of the screen of the terminal according to the boundary setting operation, wherein the offset values include a left offset value X1 between the left boundary of the interface safe operation zone and a left screen boundary of the screen of the terminal, a right offset value X2 between the right boundary of the interface safe operation zone and a right screen boundary of the screen of the terminal, an upper offset value Y1 between the upper boundary of the interface safe operation zone and an upper screen boundary of the screen of the terminal, and a lower offset value Y2 between the lower boundary of the interface safe operation zone and a lower screen boundary of the screen of the terminal; and generate, according to the offset values, the interface safe operation zone adapted to the terminal.

11. The apparatus according to claim 10, wherein the processor is further configured to:

read a resolution of the screen of the terminal, and determine a first aspect ratio of the terminal according to the resolution of the screen; and set a second aspect ratio of the setting interface the same as the first aspect ratio according to the first aspect ratio.

12. The apparatus according to claim 11, wherein the processor is further configured to:

in a case that the first aspect ratio is 4:3, set a width of the setting interface of the interface safe operation zone as a width of the resolution of the screen; perform upper-lower cropping on a height of the setting interface according to the second aspect ratio 4:3; and display the cropped setting interface of the second aspect ratio of 4:3; and in a case that the second aspect ratio is 16:9 set a height of the setting interface of the interface safe operation zone as a height of the resolution of the screen; perform left-right cropping on a width of the setting interface according to the second aspect ratio 16:9; and display the cropped setting interface of the second aspect ratio of 16:9.

13. A non-transitory computer-readable storage medium, the storage medium storing at least one instruction, at least one program, and a code set or an instruction set, the at least one instruction, the at least one program, and the code set or the instruction set being loaded and executed by a processor of a terminal to implement:

displaying a background layer of an application running on the terminal, the background layer includes one or more of a virtual soldier, a virtual animal, or a virtual anime character;

displaying a setting interface for setting zone boundaries of an interface safe operation zone, wherein the zone boundaries include a left boundary, a right boundary, an upper boundary, and a lower boundary, and wherein a four-sided area defined between the left, the right, the upper, and the lower boundaries of the zone boundaries and screen boundaries of a screen of the terminal is inactive and is not a zone used for displaying a human-computer interaction control responsive to one or more gesture operations;

setting the interface safe operation zone to be functionally and visually separate from and independent of the background layer of the application, wherein the background layer is greater in area than the interface safe operation zone;

receiving a boundary setting operation triggered on the setting interface;

determining offset values between of the zone boundaries of the interface safe operation zone and the screen boundaries of the screen of the terminal according to the boundary setting operation, wherein the offset values include a left offset value X1 between the left boundary of the interface safe operation zone and a left screen boundary of the screen of the terminal, a right offset value X2 between the right boundary of the interface safe operation zone and a right screen boundary of the screen of the terminal, an upper offset value Y1 between the upper boundary of the interface safe operation zone and an upper screen boundary of the screen of the terminal, and a lower offset value Y2 between the lower boundary of the interface safe operation zone and a lower screen boundary of the screen of the terminal;

generating, according to the positional parameters, the interface safe operation zone adapted to the terminal; and generating, according to the offset values, the interface safe operation zone adapted to the terminal.

* * * * *